(12) United States Patent
Shim et al.

(10) Patent No.: US 11,678,082 B2
(45) Date of Patent: *Jun. 13, 2023

(54) IMAGE SENSOR

(71) Applicant: SAMSUNG ELECTRONICS CO., LTD., Suwon-si (KR)

(72) Inventors: Eun Sub Shim, Hwaseong-si (KR); Kyungho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

This patent is subject to a terminal disclaimer.

(21) Appl. No.: 17/139,427

(22) Filed: Dec. 31, 2020

(65) Prior Publication Data
US 2021/0152765 A1  May 20, 2021

Related U.S. Application Data

(63) Continuation of application No. 16/838,517, filed on Apr. 2, 2020, now Pat. No. 10,917,592, which is a (Continued)

(30) Foreign Application Priority Data

Dec. 30, 2016 (KR) .......................... 10-2016-0183465

(51) Int. Cl.
  *H04N 5/58* (2006.01)
  *H04N 25/589* (2023.01)
  (Continued)

(52) U.S. Cl.
  CPC ........... *H04N 25/589* (2023.01); *H04N 23/10* (2023.01); *H04N 23/76* (2023.01); *H04N 25/44* (2023.01);
  (Continued)

(58) Field of Classification Search
  CPC .... H04N 5/35581; H04N 5/243; H04N 5/345; H04N 5/35563; H04N 5/3559; H04N 5/3575; H04N 5/37457; H04N 9/045
  See application file for complete search history.

(56) References Cited

U.S. PATENT DOCUMENTS 7,728,896 B2  6/2010  McKee
7,830,436 B2  11/2010  Sumi et al.
(Continued)

FOREIGN PATENT DOCUMENTS

CN      1645918 A      7/2005
CN   205566484 U      9/2016
(Continued)

*Primary Examiner* — Twyler L Haskins
*Assistant Examiner* — Fayez A Bhuiyan
(74) *Attorney, Agent, or Firm* — Sighrue Mion, PLLC

(57) ABSTRACT

An image sensor includes a pixel array including a plurality of unit pixels arranged along a plurality of rows and a plurality of columns. Each of the unit pixels includes a photoelectric conversion element generating and accumulating photocharges, a charge detection node receiving the photocharges accumulated in the photoelectric conversion element, a readout circuit converting the photocharges accumulated in and output from the charge detection node into an electrical pixel signal, the readout circuit outputting the electrical pixel signal, a capacitive element, and a switching element controlling connection between the charge detection node and the capacitive element. Each of the rows of the pixel array includes first pixels connected to a first conversion gain control line and second pixels connected to a second conversion gain control line.

16 Claims, 26 Drawing Sheets

Related U.S. Application Data continuation of application No. 15/805,368, filed on Nov. 7, 2017, now Pat. No. 10,645,315.

(51) Int. Cl.

| | | |
|---|---|---|
| *H04N 23/10* | (2023.01) | |
| *H04N 23/76* | (2023.01) | |
| *H04N 25/44* | (2023.01) | |
| *H04N 25/59* | (2023.01) | |
| *H04N 25/585* | (2023.01) | |
| *H04N 25/616* | (2023.01) | |
| *H04N 25/778* | (2023.01) | |

(52) U.S. Cl.
CPC ........... *H04N 25/585* (2023.01); *H04N 25/59* (2023.01); *H04N 25/616* (2023.01); *H04N 25/778* (2023.01)

(56) References Cited

U.S. PATENT DOCUMENTS

| | | | |
|---|---|---|---|
| 8,089,530 | B2 | 1/2012 | Mabuchi |
| 8,294,077 | B2 | 10/2012 | Mao et al. |
| 8,729,451 | B2 | 5/2014 | Bikumandla |
| 9,363,450 | B2 | 6/2016 | Nakamura et al. |
| 9,398,239 | B2 | 7/2016 | Ito et al. |
| 9,888,191 | B2 | 2/2018 | Beck |
| 10,645,315 | B2 * | 5/2020 | Shim ............... H04N 5/3559 |
| 2006/0103749 | A1 | 5/2006 | He |
| 2007/0013797 | A1 | 1/2007 | McKee |
| 2009/0273695 | A1 | 11/2009 | Mabuchi |
| 2012/0153123 | A1 | 6/2012 | Mao et al. |
| 2013/0048831 | A1 | 2/2013 | Bikumandla |
| 2014/0078368 | A1 | 3/2014 | Komori et al. |
| 2014/0151532 | A1 | 6/2014 | Ito et al. |
| 2015/0054973 | A1 | 2/2015 | Velichko |
| 2015/0181149 | A1 | 6/2015 | Awatani et al. |

FOREIGN PATENT DOCUMENTS

| | | |
|---|---|---|
| JP | 4609428 B2 | 1/2011 |
| KR | 10-2016-0070753 A | 6/2016 |
| WO | 00/78034 A2 | 12/2000 |

\* cited by examiner

IMAGE SENSOR

CROSS-REFERENCE TO RELATED APPLICATIONS

This application is a Continuation Application of U.S. application Ser. No. 16/838,517, filed Apr. 2, 2020, which is a Continuation Application of U.S. application Ser. No. 15/805,368, filed on Nov. 7, 2017, now U.S. Pat. No. 10,645,315 issued May 5, 2020, which claims priority from Korean Patent Application No. 10-2016-0183465, filed on Dec. 30, 2016 in the Korean Intellectual Property Office, the disclosures of which are hereby incorporated by reference in their entireties.

BACKGROUND

Example embodiments relate to an image sensor and, more particularly, to an image sensor having a wide dynamic range (WDR).

An image sensor converts an optical image into an electrical signal. As computer and communication technologies have been developed, high-performance image sensors have been increasingly demanded in various fields such as a digital camera, a camcorder, a personal communication system (PCS), a game console, a security camera, and a medical micro camera.

Image sensors may be categorized as charge coupled device (CCD) image sensors or complementary metal-oxide-semiconductor (CMOS) image sensors. The CMOS image sensor may be simply driven. In addition, a signal processing circuit and an image sensing part of the CMOS image sensor may be integrated on a single chip. Thus, a size of the CMOS image sensor may be reduced. Moreover, the CMOS image sensor may have a very low power consumption so as to be easily applied to a product having a limited battery capacity. Furthermore, the CMOS image sensor may have a high resolution by the use of a CMOS technique. Accordingly, the CMOS image sensor is widely used in various fields.

SUMMARY

Example embodiments may provide an image sensor having improved optical characteristics.

According to an aspect of an example embodiment, there is provided an image sensor including a pixel array including a plurality of unit pixels arranged along a plurality of rows and a plurality of columns. Each of the plurality of unit pixels includes: a photoelectric conversion element configured to generate and accumulate photocharges; a charge detection node configured to receive the photocharges that are accumulated in the photoelectric conversion element; a readout circuit configured to convert the photocharges that are received by the charge detection node into an electrical signal, and to output the electrical signal; a capacitive element; and a switching element configured to control a connection between the charge detection node and the capacitive element. Each of the plurality of rows of the pixel array includes first pixels from among the plurality of unit pixels, and second pixels from among the plurality of unit pixels. The first pixels are connected to a first conversion gain control line, and the second pixels are connected to a second conversion gain control line.

According to an aspect of another example embodiment, there is provided an image sensor including a pixel array including a plurality of unit pixels arranged along a plurality of rows and a plurality of columns. Each of the plurality of unit pixels includes a photoelectric conversion element configured to generate and accumulate photocharges; a charge detection node configured to receive the photocharges that are accumulated in the photoelectric conversion element; a readout circuit configured to convert the photocharges that are received by the charge detection node into an electrical signal, and to output the electrical signal; a capacitive element; and a switching element configured to control a connection between the charge detection node and the capacitive element. Each of the plurality of rows of the pixel array includes first pixels from among the plurality of unit pixels, and second pixels from among the plurality of unit pixels. The first pixels have a first conversion gain and the second pixels have a second conversion gain.

According to an aspect of another example embodiment, there is provided an image sensor including a pixel array including first pixels and second pixels that are arranged in a plurality of rows and a plurality of columns of a matrix. Each the first pixels and each of the second pixels being configured to convert light that is incident thereon into an electrical signal. Each of the plurality of rows includes at least one of the first pixels and at least one of the second pixels. The first pixels have a first conversion gain that is varied according to a first amount of the light that is incident on the first pixels, and the second pixels have a second conversion gain that is varied according to a second amount of the light that is incident on the second pixels.

BRIEF DESCRIPTION OF THE DRAWINGS

The above and/or other aspects will become apparent and more readily appreciated from the following description of the example embodiments, taken in conjunction with the accompanying drawings in which.

DETAILED DESCRIPTION

Image sensors according to example embodiments will be described hereinafter in detail with reference to the accompanying drawings.

Figure 1:
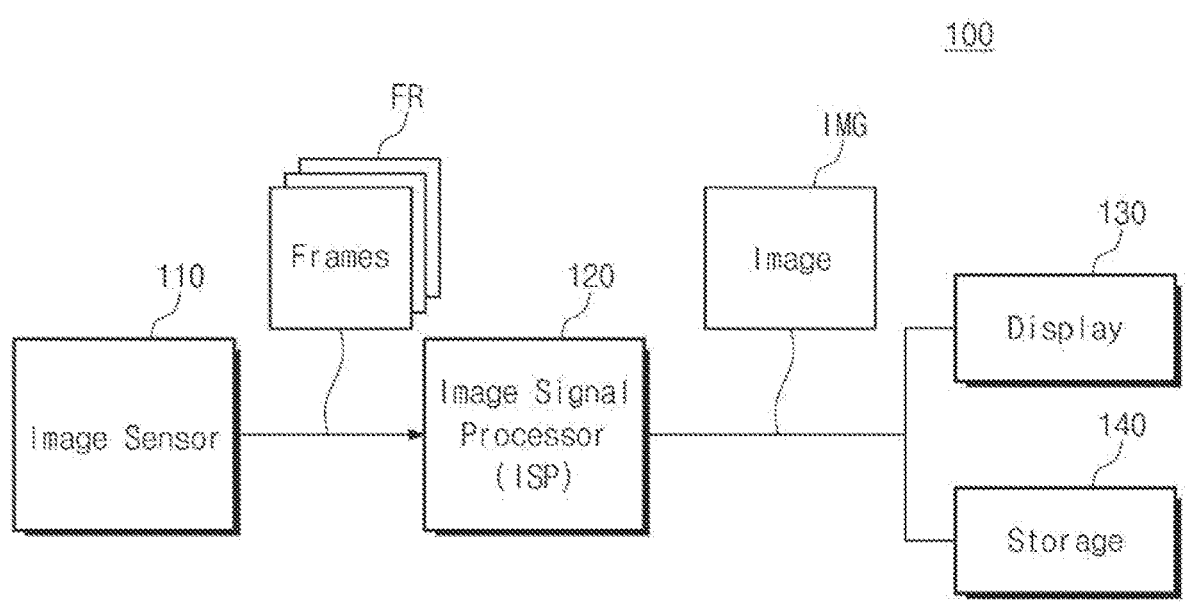
FIG. 1 is a schematic block diagram illustrating an image processing device according to an example embodiment.

FIG. 1 is a schematic block diagram illustrating an image processing device according to an example embodiment.

Referring to FIG. 1, an image processing device 100 may include an image sensor 110, an image signal processor 120, a display 130, and a storage 140.

The image processing device 100 may be an electronic device that captures external images, such as a smart phone or a digital camera.

The image sensor 110 may convert an image of an external object into electrical signals or data signals. The image sensor 110 may include a plurality of pixels. Each of the plurality of pixels may receive light reflected from the external object and may convert the received light into an electrical image signal or a photo signal.

The image signal processor 120 may process frame data FR (i.e., image data or photo data) received from the image sensor 110 and may output corrected image data IMG. For example, the image signal processor 120 may perform one or more signal processing operations (e.g., color interpolation, color correction, gamma correction, color space conversion, and/or edge correction) on the received frame data FR to generate the image data IMG.

The display 130 may display the image data IMG received from the image signal processor 120 such that a user may view the image data IMG. For example, the display 130 may include any of various display panels such as a liquid crystal display panel, a light emitting diode (LED) display panel, an organic light emitting diode (OLED) display panel, an electrophoretic display panel, and an electrowetting display panel. The display 130 may display the image data IMG through the display panel.

The storage 140 may store the image data IMG received from the image signal processor 120. The storage device 14 may include a volatile memory device (e.g., a static random access memory (SRAM) device, a dynamic RAM (DRAM) device, and/or a synchronous DRAM (SDRAM) device) and/or a non-volatile memory device (e.g., a read only memory (ROM) device, a programmable ROM (PROM) device, an electrically programmable ROM (EPROM) device, an electrically erasable and programmable ROM (EEPROM) device, a FLASH memory device, a phase-change RAM (PRAM) device, a magnetic RAM (MRAM) device, a resistive RAM (RRAM) device, and/or a ferroelectric RAM (FRAM) device).

Figure 2:
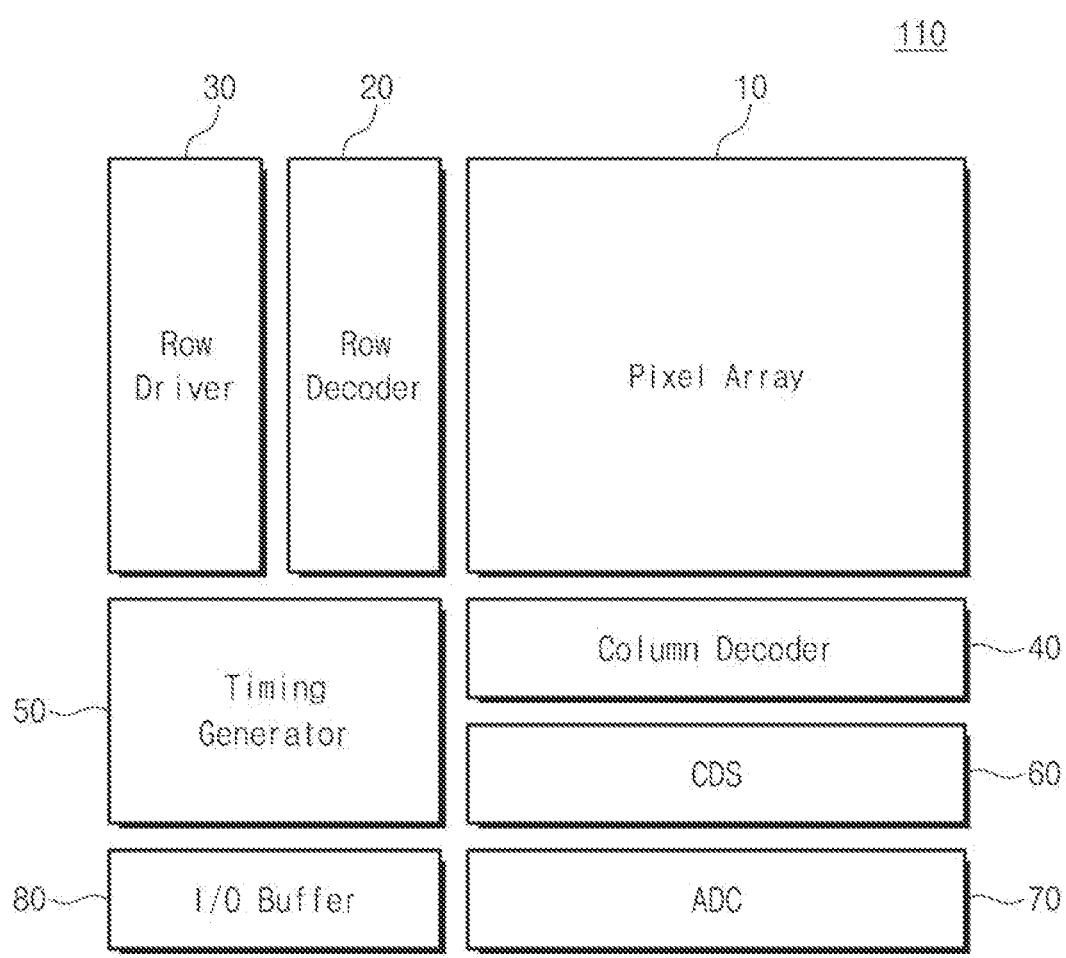
FIG. 2 is a schematic block diagram illustrating an image sensor according to an example embodiment.

FIG. 2 is a schematic block diagram illustrating an image sensor 110 according to an example embodiment.

Referring to FIG. 2, the image sensor 110 may include a pixel array 10, a row decoder 20, a row driver 30, a column decoder 40, a timing generator 50, a correlated double sampler (CDS) 60, an analog-to-digital converter (ADC) 70, and an input/output (I/O) buffer 80.

The pixel array 10 may include a plurality of unit pixels arranged in a matrix of rows and columns and may convert light incident on the unit pixels into electrical signals. The pixel array 10 may be driven by a plurality of driving signals (e.g., a selection signal, a reset signal, and/or a charge transfer signal) provided from the row decoder 20.

The row decoder 20 may provide the driving signals to the unit pixels in a unit of a row. The electrical signals converted in the pixel array 10 may be provided to the correlated double sampler 60 in response to the driving signals.

The row driver 30 may provide the driving signals for driving the unit pixels to the pixel array 10 in response to results decoded in the row decoder 20. In the event that the unit pixels are arranged in a matrix form, the driving signals may be provided in the unit of the row.

The timing generator 50 may supply control signals (e.g., clock signals and a timing control signal) to control operations the row decoder 20 and the column decoder 40, the correlated double sampler 60, the analog-to-digital converter 70, and the I/O buffer 80. The timing generator 50 may include a logic control circuit, a phase lock loop (PLL) circuit, a timing control circuit, and/or a communication interface circuit.

The correlated double sampler 60 may receive the electrical signals generated by the pixel array 10 and may hold and sample the received electrical signals. The correlated double sampler 60 may doubly sample a specific noise level and a signal level of the electrical signal and may output a difference level corresponding to a difference between the noise level and the signal level.

The analog-to-digital converter 70 may convert an analog signal, which corresponds to the difference level output from the correlated double sampler 60, into a digital signal and output the digital signal.

The I/O buffer 80 may latch the digital signals output from the analog-to-digital converter 70 and may sequentially output the latched digital signals to an image signal processor (e.g., the image signal processor 120 of FIG. 1) in response to results decoded in the column decoder 40.

Figure 3:
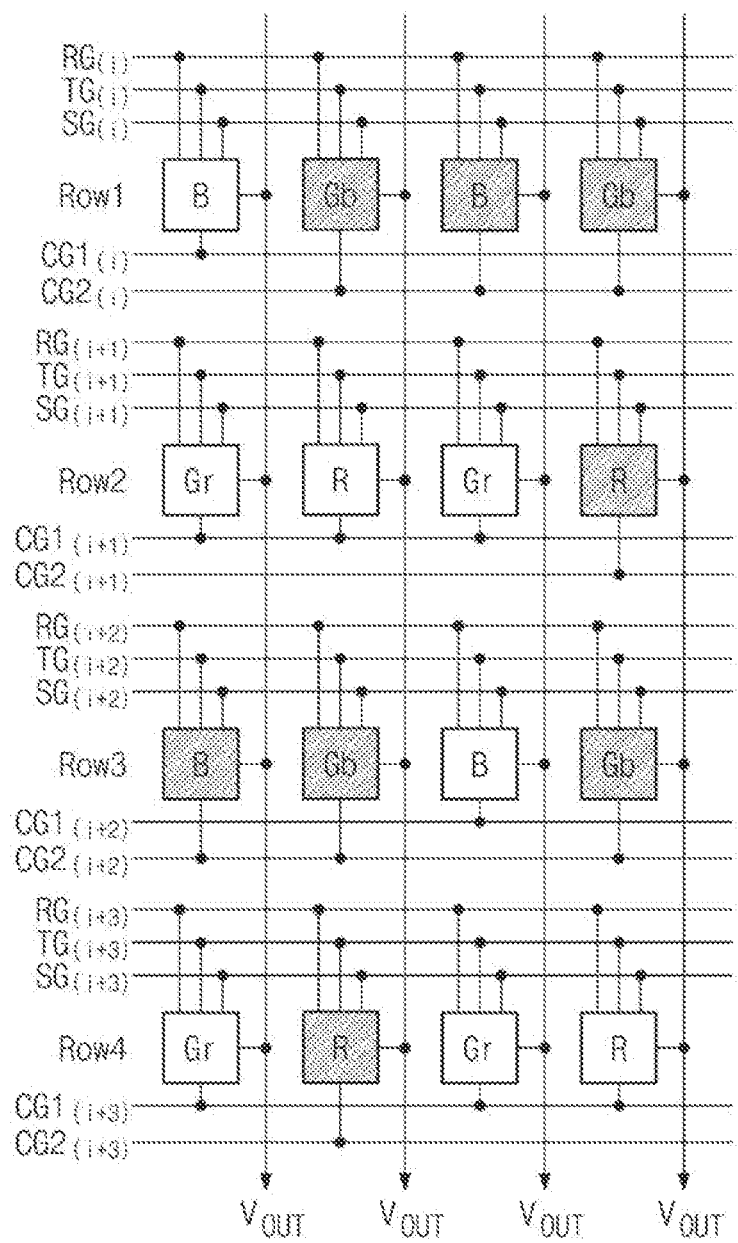
FIG. 3 is a schematic diagram illustrating a pixel array of an image sensor according to an example embodiment.

FIG. 3 is a schematic diagram illustrating a pixel array 10 of an image sensor according to an example embodiment.

Referring to FIG. 3, the pixel array 10 may include a plurality of unit pixels R, B, Gb, and Gr arranged along a plurality of rows Row1, Row2, Row3, and Row4 and a plurality of columns, a plurality of driving signal lines $RG_{(i)}$ to $RG_{(i+3)}$, $TG_{(i)}$ to $TG_{(i+3)}$, $SG_{(i)}$ to $SG_{(i+3)}$, $CG1_{(i)}$ to $CG1_{(i+3)}$, and $CG2_{(i)}$ to $CG2_{(i+3)}$, and output lines VOUT. For example, FIG. 3 illustrates a 4×4 pixel array 10. For example, the 4×4 pixel array 10 may be repeated along a row direction and a column direction.

An electrical signal may be generated by incident light in each of the unit pixels R, B, Gb, and Gr, and the unit pixels R, B, Gb, and Gr may be driven by driving signals transmitted through charge transfer lines $TG_{(i)}$ to $TG_{(i+3)}$, reset lines $RG_{(i)}$ to $RG_{(i+3)}$, and selection lines $SG_{(i)}$ to $SG_{(i+3)}$.

The driving signal lines $RG_{(i)}$ to $RG_{(i+3)}$, $TG_{(i)}$ to $TG_{(i+3)}$, $SG_{(i)}$ to $SG_{(i+3)}$, $CG1_{(i)}$ to $CG1_{(i+3)}$, and $CG2_{(i)}$ to $CG2_{(i+3)}$ may extend in the row direction (e.g., a horizontal direction) to drive the unit pixels R, B, Gb, and Gr included in the same row at the same time. In some example embodiments, the driving signal lines may include the charge transfer lines $TG_{(i)}$ to $TG_{(i+3)}$, the reset lines $RG_{(i)}$ to $RG_{(i+3)}$, the selection lines $SG_{(i)}$ to $SG_{(i+3)}$, first conversion gain control lines $CG1_{(i)}$ to $CG1_{(i+3)}$, and second conversion gain control lines $CG2_{(i)}$ to $CG2_{(i+3)}$. The charge transfer lines $TG_{(i)}$ to $TG_{(i+3)}$, the reset lines $RG_{(i)}$ to $RG_{(i+3)}$, and the selection lines $SG_{(i)}$ to $SG_{(i+3)}$ may be connected in common to the unit pixels R, B, Gb, and Gr of a same row. The output lines $V_{OUT}$ may extend in the column direction (e.g., a vertical direction), and each of the output lines $V_{OUT}$ may be connected in common to the unit pixels R, B, Gb, and Gr arranged in a same column.

Each of the unit pixels R, B, Gb, and Gr may include a photoelectric conversion element and three, four, five, or six MOS transistors constituting a readout circuit. In some example embodiments, the unit pixels R, B, Gb, and Gr may have the same circuit elements, and this will be described later with reference to FIGS. 4A to 4D.

The photoelectric conversion elements of the unit pixels R, B, Gb, and Gr may generate and accumulate photocharges in proportion to the amount of incident light. The photoelectric conversion elements of the unit pixels R, B, Gb, and Gr may have substantially the same full well capacity, and the amounts of photocharges generated and accumulated in the photoelectric conversion elements may be different from each other by environments (low illumination and high illumination) in which an image is taken. For example, the photoelectric conversion element may include a photodiode, a photo transistor, a photo gate, a pinned photodiode (PPD), or any combination thereof.

Since low-illumination light and high-illumination light may be incident on the pixel array 10 at the same time when an image is taken or obtained, the amounts of photocharges generated and accumulated in the photoelectric conversion elements may be different according to the amounts of light incident on the unit pixels R, B, Gb, and Gr. In other words, the unit pixels R, B, Gb, and Gr on which the low-illumination light is incident may generate a small amount of photocharges, and thus it is required to improve sensitivity of the unit pixels R, B, Gb, and Gr provided with the low-illumination light. On the contrary, the unit pixels R, B, Gb, and Gr on which the high-illumination light is incident may generate a large amount of photocharges, and thus it is required to reduce noise of the unit pixels R, B, Gb, and Gr provided with the high-illumination light. However, according to some example embodiments, gains of the unit pixels R, B, Gb, and Gr may be individually controlled or adjusted to enlarge or increase a dynamic range of the image sensor. Thus, a bright region (or a high-illumination region) and a dark region (or a low-illumination region) of an image may be clearly realized at the same time.

In more detail, in each of the rows Row1, Row2, Row3, and Row4, of the pixel array 10, each of the unit pixels R, B, Gb, and Gr may be connected to one of the first conversion gain control lines $CG1_{(i)}$, $CG1_{(i+1)}$, $CG1_{(i+2)}$, and $CG1_{(i+3)}$ or one of the second conversion gain control lines $CG2_{(i)}$, $CG2_{(i+1)}$, $CG2_{(i+2)}$, and $CG2_{(i+3)}$, and conversion gains of the unit pixels R, B, Gb, and Gr may be variable according to first conversion gain control signals provided through the first conversion gain control lines CG1(i), CG1(i+1), CG1(i+2), and CG1(i+3) and second conversion gain control signals provided through the second conversion gain control lines CG2(i), CG2(i+1), CG2(i+2), and CG2(i+3). The first conversion gain control signal and the second conversion gain control signal may be varied according to an illumination amount of light incident on the pixel array 10.

In more detail, each of the rows Row1, Row2, Row3, and Row4 of the pixel array 10 may include first pixels connected to one of the first conversion gain control lines $CG1_{(i)}$, $CG1_{(i+1)}$, $CG1_{(i+2)}$, and $CG1_{(i+3)}$ and second pixels connected to one of the second conversion gain control lines $CG2_{(i)}$, $CG2_{(i+1)}$, $CG2_{(i+2)}$, and $CG2_{(i+3)}$. Each of the first and second pixels may have a first conversion gain or a second conversion gain by each of the first or second conversion gain control signals provided through the first conversion gain control lines CG1(i), CG1(i+1), CG1(i+2), and CG1(i+3) and the second conversion gain control signals provided through the second conversion gain control lines CG2(i), CG2(i+1), CG2(i+2), and CG2(i+3).

In some example embodiments, the first pixels and the second pixels may be arranged in a form of a checkerboard mosaic pattern. Thus, the first pixels may be arranged in a stepped pattern in a diagonal direction, and the second pixels may be arranged in a pattern shape in the diagonal direction. In more detail, the number (i.e., a first number) of the first pixels may be different from the number (i.e., a second number) of the second pixels in each of the rows Row1, Row2, Row3, and Row4. In addition, the number (i.e., a first number) of the first pixels disposed in odd-numbered rows Row1 and Row3 may be different from the number (i.e., a second number) of the first pixels disposed in even-numbered rows Row2 and Row4. Likewise, the number (i.e., a first number) of the first pixels may be different from the number (i.e., a second number) of the second pixels in each of the columns. In addition, the number (i.e., a first number) of the first pixels disposed in an odd-numbered column may be different from the number (i.e., a second number) of the first pixels disposed in an even-numbered column.

For example, in the 4×4 pixel array 10, one first pixel and three second pixels may be disposed in each of the odd-numbered rows Row1 and Row3, and three first pixels and one second pixel may be disposed in each of the even-numbered rows Row2 and Row4. Three first pixels and one second pixel may be disposed in each of the odd-numbered columns, and one first pixel and three second pixels may be disposed in each of the even-numbered columns. In other words, in each of the odd-numbered rows Row1 and Row3, one of the first conversion gain control lines $CG1_{(i)}$ and $CG1_{(i+2)}$ may be connected to one of the unit pixels R, B, Gb, and Gr and one of the second conversion gain control lines $CG2_{(i)}$ and $CG2_{(i+2)}$ may be connected to a remaining three of the unit pixels R, B, Gb, and Gr. In each of the even-numbered rows Row2 and Row4, one of the first conversion gain control lines $CG1_{(i+1)}$ and $CG1_{(i+3)}$ may be connected to three of the unit pixels R, B, Gb, and Gr and one of the second conversion gain control lines $CG2_{(i+1)}$ and $CG2_{(i+3)}$ may be connected to a remaining one of the unit pixels R, B, Gb, and Gr.

In addition, each of the unit pixels R, B, Gb, and Gr may include a color filter having three colors or four colors. In other words, each of the first and second pixels according to some example embodiments may include a blue color filter (B), a red color filter (R), or a green color filter (Gb or Gr). However, embodiments are not limited thereto. In some example embodiments, the unit pixels R, B, Gb, and Gr of the pixel array 10 may include color filters that transmit magenta (Mg) light, yellow (Y) light, cyan (Cy) light, and/or white (W) light. One or some of the unit pixels R, B, Gb, and Gr may include an infrared filter (Z) that transmits infrared light.

In detail, first color filters (red color filters (R) or blue color filters (B)) and second color filters (green color filters (Gb and Gb)) may be alternately arranged in each of the rows Row1, Row2, Row3, and Row4. Each of the color filters may receive light having a corresponding color. For example, the blue color filters (B) and the green color filters (Gb) may be alternately arranged in each of the odd-numbered rows Row1 and Row3, and the red color filters (R) and the green color filters (Gr) may be alternately arranged in each of the even-numbered rows Row2 and Row4. Here, the blue color filters (B) and the red color filters (R) may be arranged in a diagonal direction. In other words, the green color filters (Gb or Gr) relative to a brightness signal may be disposed in all of the rows Row1, Row2, Row3, and Row4, the blue color filters (B) may be disposed in the odd-numbered rows Row1 and Row3, and the red color filters (R) may be disposed in the even-numbered rows Row2 and Row4. Thus, a resolution of the image sensor may be improved.

FIGS. 4A, 4B, 4C 4D are circuit diagrams illustrating a unit pixel of a pixel array according to example embodiments.

Referring to FIGS. 4A, 4B, 4C and 4D, a unit pixel may include a photoelectric conversion element PD, a transfer transistor TX, a readout circuit, and a conversion gain variable circuit. Here, the readout circuit may include a reset transistor RX, a selection transistor SX, and a drive transistor DX. The conversion gain variable circuit may include a conversion gain transistor CGX and a capacitor CAP.

In more detail, the photoelectric conversion element PD may generate and accumulate photocharges corresponding to incident light. For example, the photoelectric conversion element PD may include a photodiode, a photo transistor, a photo gate, a pinned photodiode (PPD), or any combination thereof.

The transfer transistor TX may transfer the photocharges accumulated in the photoelectric conversion element PD to a charge detection node FD (i.e., a floating diffusion region). The charge transfer line TG may be connected a transfer gate electrode of the transfer transistor TX, and the transfer transistor TX may be controlled by the charge transfer signal provided by the charge transfer line TG to the transfer gate electrode.

The charge detection node FD may receive the photocharges generated in the photoelectric conversion element PD and may cumulatively store the received photocharges. The drive transistor DX may be controlled according to the amount of the photocharges accumulated in the charge detection node FD.

The reset transistor RX may periodically reset photocharges accumulated in the charge detection node FD. In detail, a drain terminal of the reset transistor RX may be connected to the charge detection node FD, and a source terminal of the reset transistor RX may be connected to a pixel power voltage $V_{PIX}$. When the reset transistor RX is turned on, the pixel power voltage $V_{PIX}$ connected to the source terminal of the reset transistor RX may be transmitted to the charge detection node FD. Thus, the photocharges accumulated in the charge detection node FD may be discharged to reset the charge detection node FD when the reset transistor RX is turned on.

A gate electrode of the drive transistor DX may be connected to the charge detection node FD. The drive transistor DX may be a source follower buffer amplifier that generates a source-drain current in proportion to the amount of the photocharges of the charge detection node FD. The drive transistor DX may amplify a variation in potential of the charge detection node FD and may output the amplified signal to the output line $V_{OUT}$ through the selection transistor SX. A source terminal of the drive transistor DX may be connected to the pixel power voltage $V_{PIX}$, and a drain terminal of the drive transistor DX may be connected to a source terminal of the selection transistor SX.

The photocharges stored in the charge detection node FD may be converted into an electrical signal, which is represented by the following Equation 1, through the drive transistor DX.

$$V = q/C_{FD}$$ [Equation 1]

In Equation 1, "V" is an output voltage, "q" is the amount of photocharges generated by light, and "$C_{FD}$" is a capacitance of the charge detection node FD.

In other words, a conversion gain of the drive transistor DX outputting the electrical signal in proportion to the amount of the photocharges detected in the charge detection node FD may be varied according to the capacitance of the charge detection node FD.

The selection transistor SX may select the unit pixels to be sensed in the unit of row. The selection line SG may be connected to a selection gate electrode of the selection transistor SX. When the selection transistor SX is turned on by the selection signal provided by the selection line G, the electrical signal output from the drain terminal of the drive transistor DX may be output to the output line $V_{OUT}$.

The conversion gain variable circuit may vary the capacitance of the charge detection node FD to vary the conversion gain of the unit pixel. In some example embodiments, the unit pixel may have a first conversion gain or a second conversion gain.

The conversion gain transistor CGX may be connected in series between the charge detection node FD and a first terminal of the capacitor CAP. A gate electrode of the conversion gain transistor CGX may be connected to the first conversion gain control line CG1 or the second conversion gain control line CG2, and the conversion gain transistor CGX may connect the capacitor CAP to the charge detection node FD by the first conversion gain control signal provided by the first conversion gain control line CG1 or the second conversion gain control signal provided by the second conversion gain control line CG2.

Figure 4A:
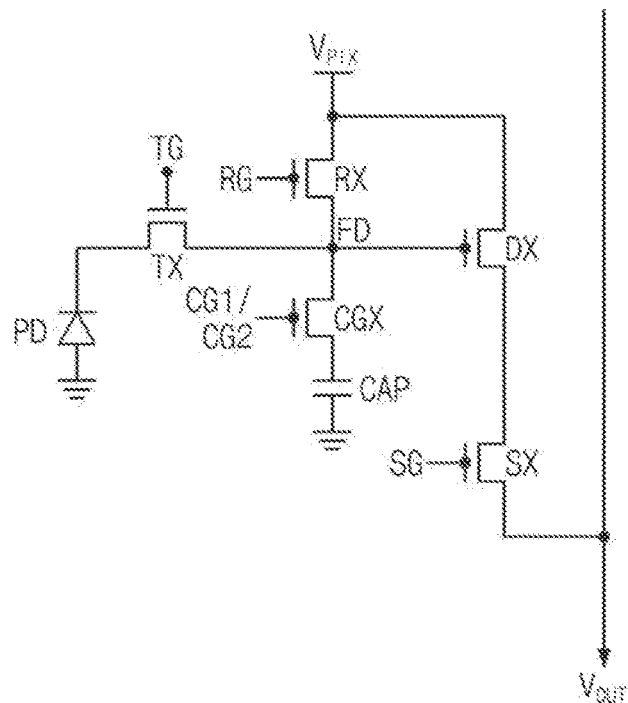
FIGS. 4A, 4B, 4C and 4D are circuit diagrams illustrating a unit pixel of a pixel array according to example embodiments.

According to the example embodiment illustrated in FIG. 4A, the first terminal of the capacitor CAP may be connected to the conversion gain transistor CGX, and a second terminal of the capacitor CAP may be connected to a ground. The capacitor CAP may be connected to the charge detection node FD when the conversion gain transistor CGX is turned on, and thus the capacitance of the charge detection node FD may be increased. In other words, since an input impedance of the drive transistor DX increases, the unit pixel may have a low conversion gain. On the contrary, when the conversion gain transistor CGX is turned off, the capacitor CAP may be electrically isolated from the charge detection node FD. In this case, the unit pixel may have a high conversion gain.

Figure 4B:
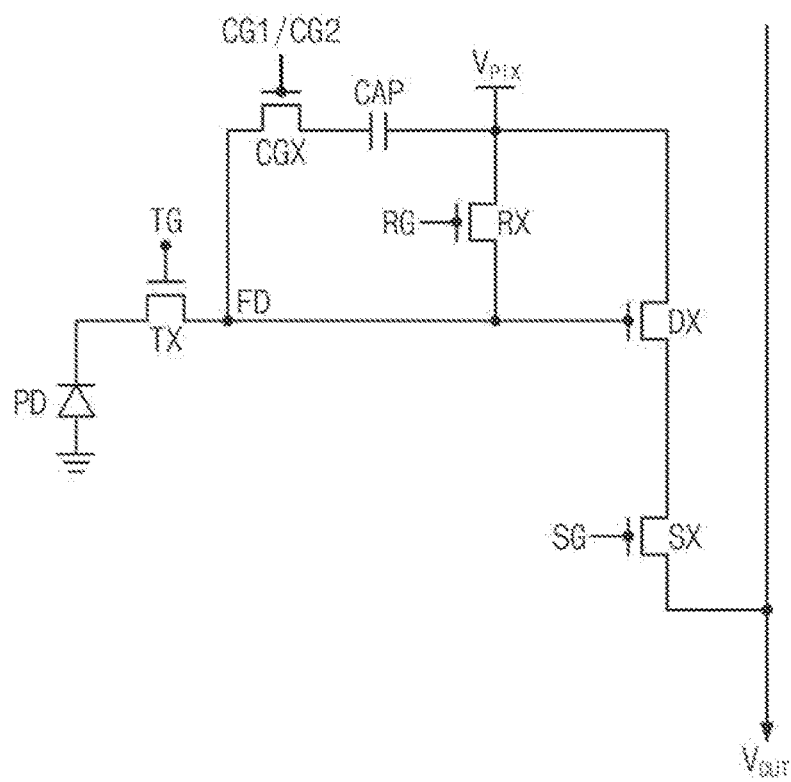

According to the example embodiment illustrated in FIG. 4B, the capacitor CAP may be connected between the conversion gain transistor CGX and the pixel power voltage $V_{PIX}$.

Figure 4C:
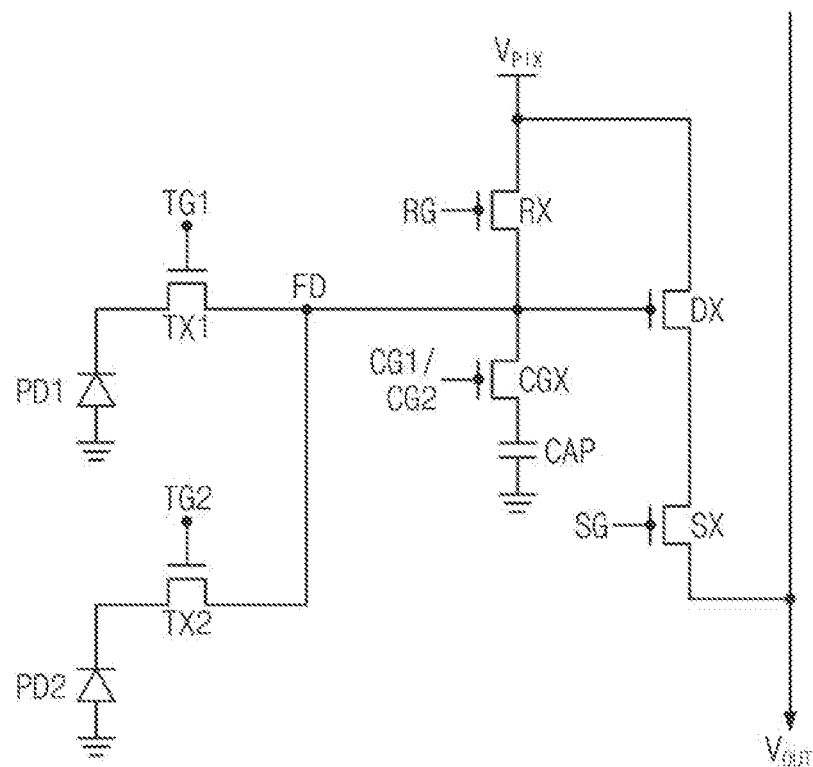

According to the example embodiment illustrated in FIG. 4C, a unit pixel may include a first photoelectric conversion element PD1, a second photoelectric conversion element PD2, a first transfer transistor TX1 and a second transfer transistor TX2. The first transfer transistor TX1 and the second transfer transistor TX2 may share the charge detection node FD (i.e., a floating diffusion region).

A transfer gate electrode of the first transfer transistor TX1 may be connected to a first charge transfer line TG1, and the first transfer transistor TX1 may transfer photocharges accumulated in the first photoelectric conversion element PD1 to the charge detection node FD (i.e., floating diffusion region) by a first charge transfer signal provided by the first charge transfer line TG1.

A transfer gate electrode of the second transfer transistor TX2 may be connected to a second charge transfer line TG2, and the second transfer transistor TX2 may transfer photocharges accumulated in the second photoelectric conversion element PD2 to the charge detection node FD (i.e., floating diffusion region) by a second charge transfer signal provided by the second charge transfer line TG2.

Figure 4D:
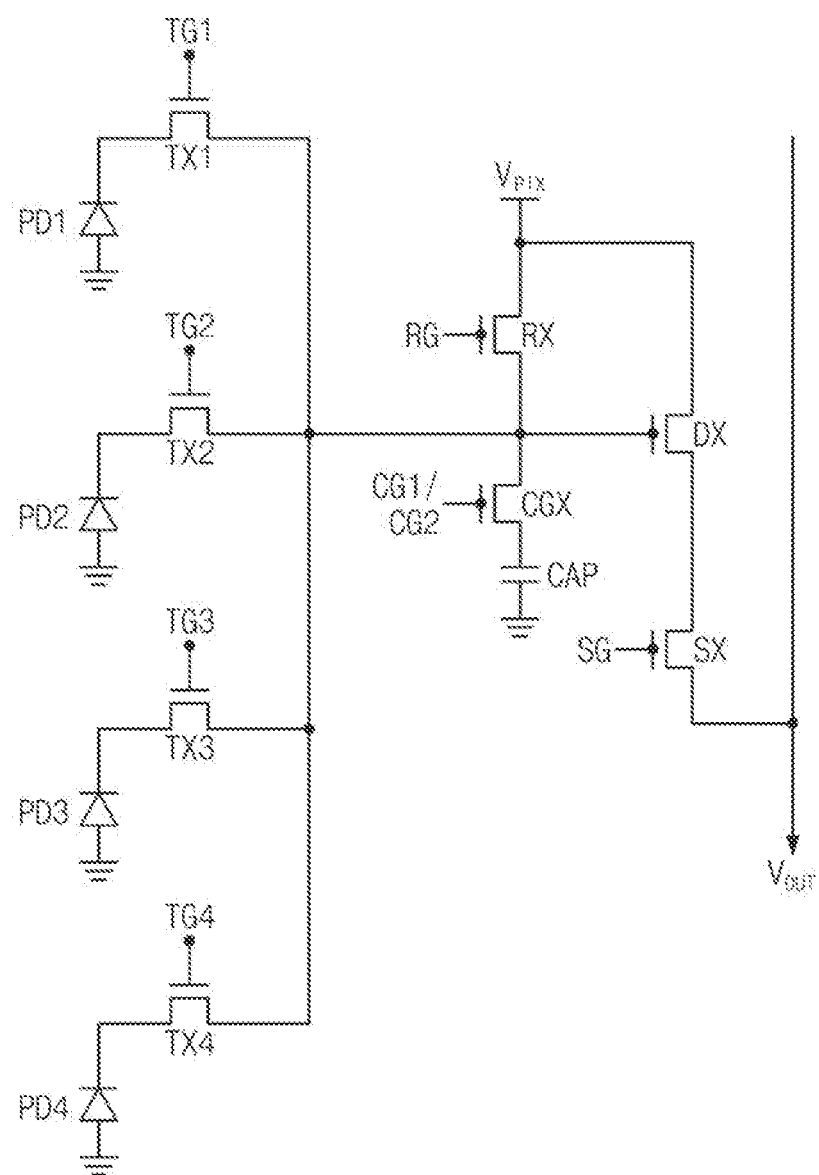

According to the example embodiment illustrated in FIG. 4D, a unit pixel may include first photoelectric conversion element PD1, a second photoelectric conversion element PD2, a third photoelectric conversion element PD3, a fourth photoelectric conversion element PD4, a first transfer transistor TX1, a second transfer transistor TX2, a third transfer transistor TX3, and a fourth transfer transistor TX4. The first transfer transistor TX1, the second transfer transistor TX2, the third transfer transistor TX3, and the fourth transfer transistor TX4 may share the charge detection node FD. The first transfer transistor TX1, the second transfer transistor TX2, the third transfer transistor TX3, and the fourth transfer transistor TX4 may be connected to a first charge transfer lines TG1, a second charge transfer line TG2, a third charge transfer line TG3, and a fourth charge transfer line TG4, respectively.

A transfer gate electrode of the first transfer transistor TX1 may be connected to the first charge transfer line TG1, and the first transfer transistor TX1 may transfer photocharges accumulated in the first photoelectric conversion element PD1 to the charge detection node FD (i.e., floating diffusion region) by a first charge transfer signal provided by the first charge transfer line TG1.

A transfer gate electrode of the second transfer transistor TX2 may be connected to the second charge transfer line TG2, and the second transfer transistor TX2 may transfer photocharges accumulated in the second photoelectric conversion element PD2 to the charge detection node FD by a second charge transfer signal provided by the second charge transfer line TG2.

A transfer gate electrode of the third transfer transistor TX3 may be connected to the third charge transfer line TG3, and the third transfer transistor TX3 may transfer photocharges accumulated in the third photoelectric conversion element PD3 to the charge detection node FD by a third charge transfer signal provided by the third charge transfer line TG3.

A transfer gate electrode of the fourth transfer transistor TX4 may be connected to the fourth charge transfer line TG4, and the fourth transfer transistor TX4 may transfer photocharges accumulated in the fourth photoelectric conversion element PD4 to the charge detection node FD by a fourth charge transfer signal provided by the fourth charge transfer line TG4.

Accordingly, as illustrated in FIGS. 4C and 4D, a unit pixel may include a plurality of photoelectric conversion elements and a plurality of transfer transistors.

Figure 5:
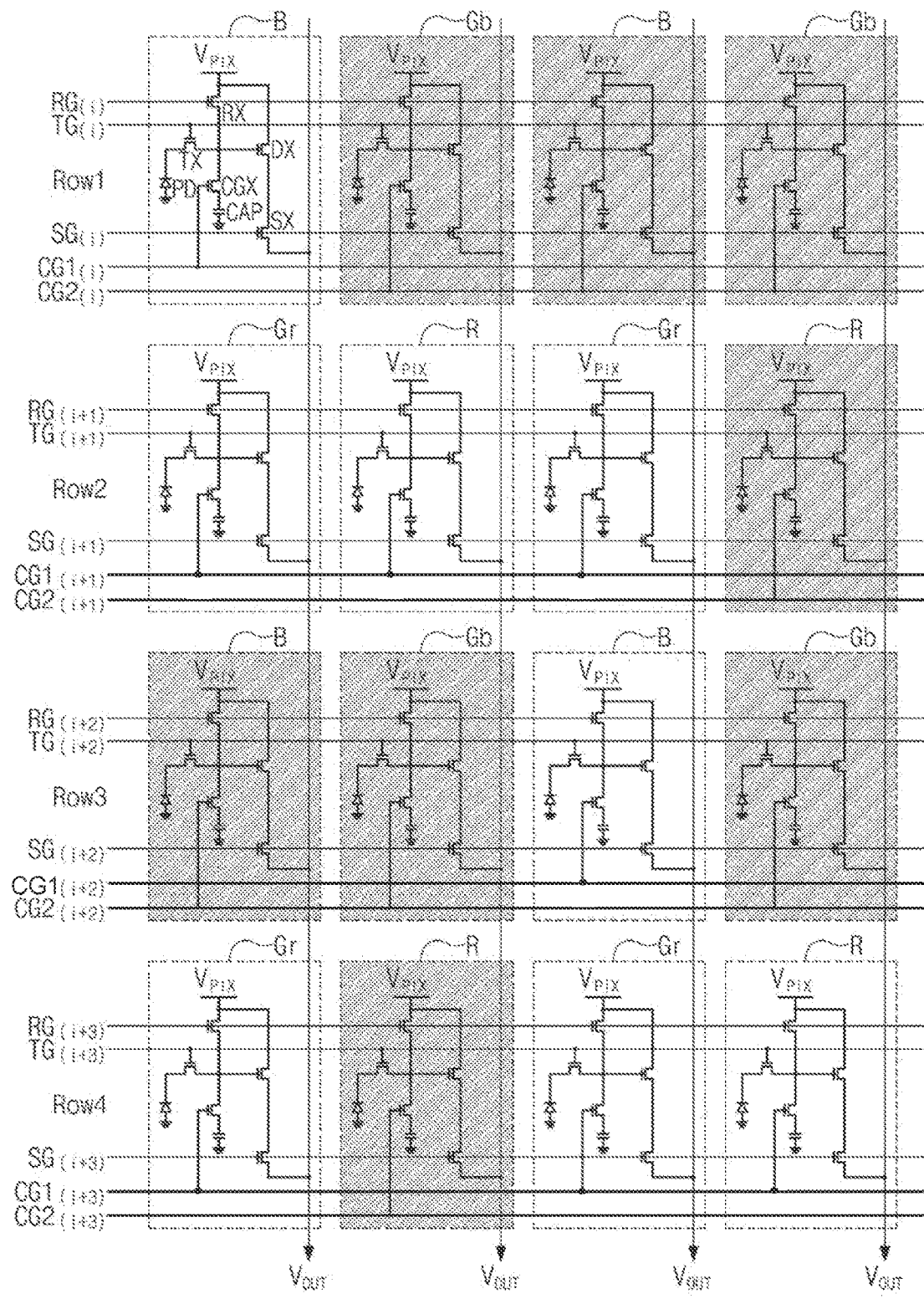
FIG. 5 is a circuit diagram illustrating a pixel array of an image sensor according to an example embodiment.

FIG. 5 is a circuit diagram illustrating a pixel array of an image sensor according to an example embodiment.

Referring to FIG. 5, unit pixels R, B, Gb, and Gr may be arranged along rows Row1, Row2, Row3, and Row4 and columns, and each of the rows Row1, Row2, Row3, and Row4 may include both first and second pixels. In some example embodiments, each of the first and second pixels may include the photoelectric conversion element PD, the transfer transistor TX, the reset transistor RX, the drive transistor DX, the selection transistor SX, the conversion gain transistor CGX, and the capacitor CAP, which are described with reference to FIG. 4A. Alternatively, each of the first and second pixels may include the elements of FIG. 4B, 4C, or 4D.

A 4×4 pixel array 10 is illustrated as an example in FIG. 5. For example, as described with reference to FIG. 3, each of odd-numbered rows Row1 and Row3 may include one first pixel and three second pixels, and each of the even-numbered rows Row2 and Row4 may include three first pixels and one second pixel.

In each of the rows Row1, Row2, Row3, and Row4, the conversion gain transistors CGX of the first pixels may be connected to one of the first conversion gain control lines $CG1_{(i)}$, $CG1_{(i+1)}$, $CG1_{(i+2)}$, and $CG1_{(i+3)}$ and the conversion gain transistors CGX of the second pixels may be connected to one of the second conversion gain control lines $CG2_{(i)}$, $CG2_{(i+1)}$, $CG2_{(i+2)}$, and $CG2_{(i+3)}$.

In some example embodiments, the first conversion gain control signal may be provided from the row driver 30 of FIG. 2 to the first conversion gain control lines $CG1_{(i)}$, $CG1_{(i+1)}$, $CG1_{(i+2)}$, and $CG1_{(i+3)}$ based on a first illumination amount of light incident on the first pixels, and the second conversion gain control signal may be provided from the row driver 30 of FIG. 2 to the second conversion gain control lines $CG2_{(i)}$, $CG2_{(i+1)}$, $CG2_{(i+2)}$, and $CG2_{(i+3)}$ based on a second illumination amount of light incident on the second pixels. The conversion gains of the first and second pixels may be varied according to the first and second conversion gain control signals. These will be described in more detail with reference to FIGS. 6A to 9B.

FIGS. 6A, 7A, 8A and 9A are timing diagrams illustrating operation of the pixel array according to the example embodiment of FIG. 5. FIGS. 6B, 7B, 8B and 9B are views illustrating characteristic changes of the pixel array according to the timing diagrams of FIGS. 6A, 7A, 8A and 9A, respectively. FIGS. 6B, 7B, 8B and 9B illustrate an 8×8 pixel array 10 as an example. In addition, FIGS. 6B, 7B, 8B and 9B illustrate arrangement of high-illumination pixels LCG having a first conversion gain and low-illumination pixels HCG having a second conversion gain. Furthermore, the reference designators R, Gr, B, and Gb show arrangement of color filters in FIGS. 6B, 7B, 8B and 9B.

Figure 6A:
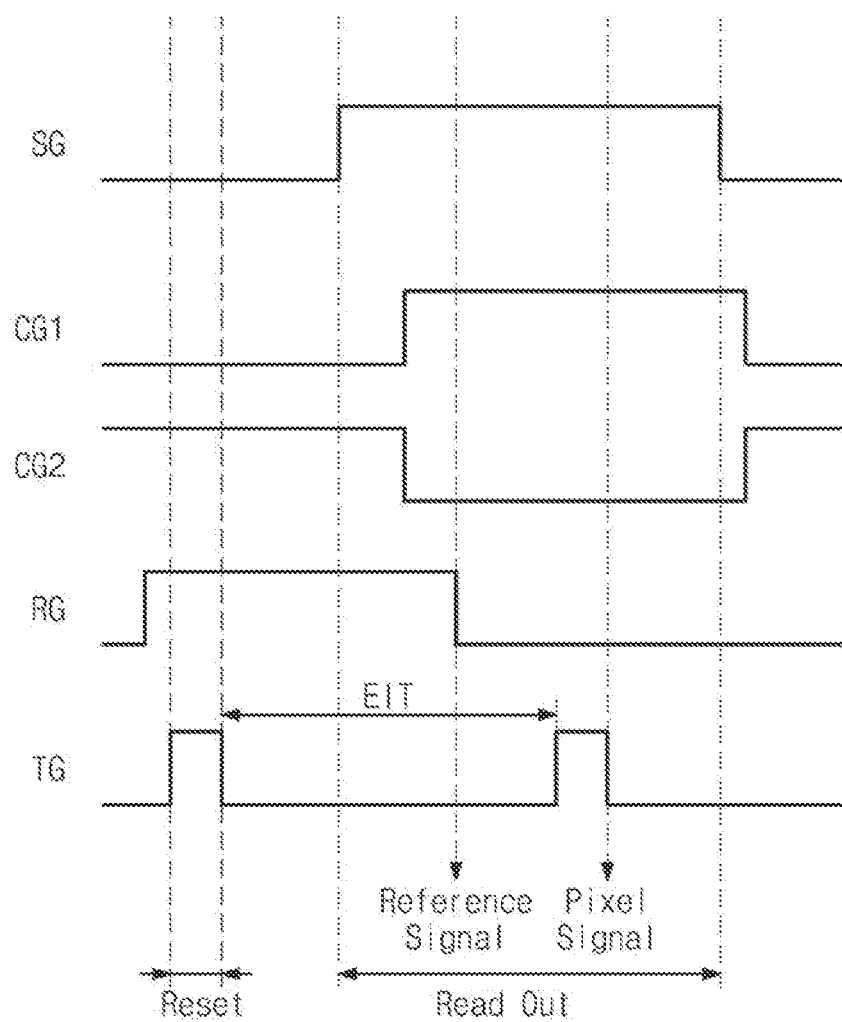
FIGS. 6A, 7A, 8A and 9A are timing diagrams illustrating operation of the pixel array according to the example embodiment of FIG. 5.
Figure 6B:
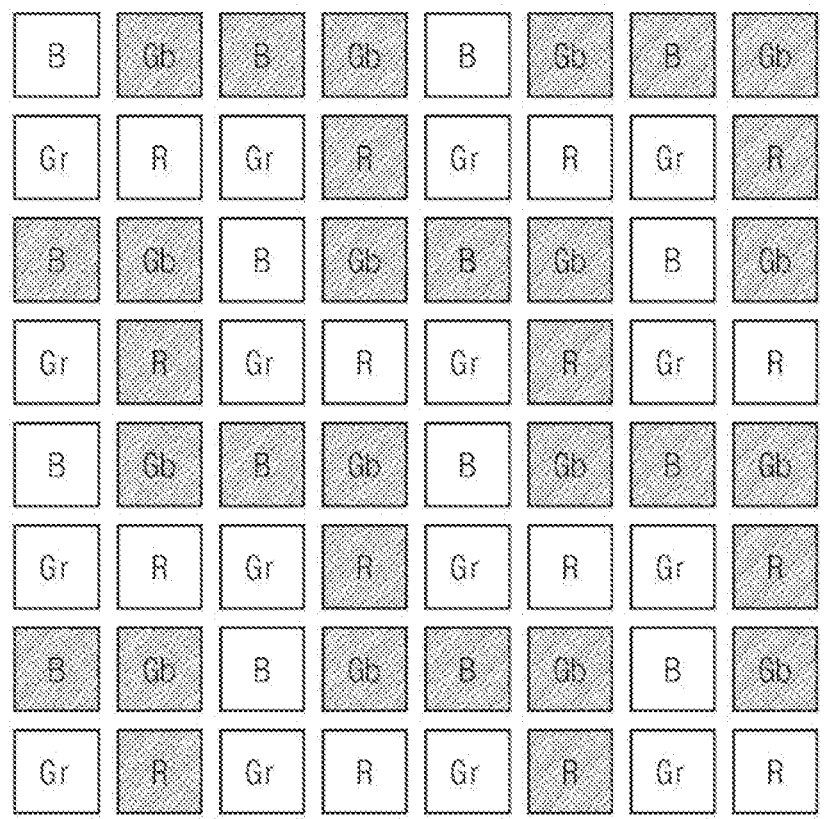
FIGS. 6B, 7B, 8B and 9B are views illustrating characteristic changes of the pixel array according to the timing diagrams of FIGS. 6A, 7A, 8A and 9A, respectively.
Figure 6B:
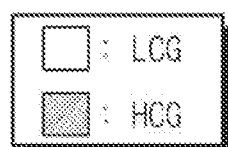

Referring to FIGS. 5, 6A, and 6B, operation of the unit pixels may include a reset mode of resetting the photoelectric conversion elements PD and the charge detection nodes FD, a light integration mode EIT of integrating or accumulating photocharges in the photoelectric conversion elements PD, and a read out mode of outputting electrical signals corresponding to the accumulated photocharges. Here, the light integration mode EIT may mean an effective integration time of light.

In the reset mode, the reset signal RG and the charge transfer signal TG may be activated to turn on the reset transistor RX and the transfer transistor TX. Thus, the pixel power voltage $V_{PIX}$ may be provided to the charge detection node FD. As a result, photocharges in the photoelectric conversion element PD and the charge detection node FD may be discharged to reset the photoelectric conversion element PD and the charge detection node FD.

The light integration mode EIT may be performed after resetting the photoelectric conversion element PD and the charge detection node FD. Photocharges may be generated and accumulated in the photoelectric conversion element PD until the transfer transistor TX is turned on again after the transfer transistor TX is turned off after completion of the reset mode (i.e., for a photoelectric conversion time). In some example embodiments, all of the unit pixels of the pixel array 10 may be exposed to light for the same time. In other words, all of the unit pixels may integrate photocharges for the same photoelectric conversion time. At this time, since light is reflected from an object having both a low-illumination region and a high-illumination region and then is incident on the pixel array 10, the amount of photocharges generated in one or more unit pixels may be different from the amount of the photocharges generated in one or more other unit pixels. Thus, the first and second conversion gain control signals may be controlled to vary the conversion gains of the unit pixels.

For example, after the start of the integration of the photocharges and before reactivation of the charge transfer signal TG, the first conversion gain control signal CG1 may be activated and the second conversion gain control signal CG2 may be inactivated. Thus, in a row selected by the selection signal SG, the conversion gain transistors CGX of the first pixels may be turned on to increase the capacitances of the charge detection nodes FD of the first pixels, and the conversion gain transistors CGX of the second pixels may be turned off to maintain the capacitances of the charge detection nodes FD of the second pixels. In other words, the capacitances of the charge detection nodes FD of the second pixels may not be varied. As a result, the first pixels may have a first conversion gain (e.g., a low conversion gain), and the second pixels may have a second conversion gain (e.g., a high conversion gain) that is higher than the first conversion gain. In other words, the first pixels may be high-illumination pixels LCG that have a low conversion gain and convert optical signals obtained from a bright portion (i.e., the high-illumination region) of the object into electrical signals. The high-illumination pixels LCG may output the converted electrical signals as first pixel signals. The second pixels may be low-illumination pixels HCG that have a high conversion gain and convert optical signals obtained from a dark portion (i.e., the low-illumination region) of the object into electrical signals. The low-illumination pixels HCG may output the converted electrical signals as second pixel signals. Thus, a high-illumination image may be obtained from the first pixels, and a low-illumination image may be obtained from the second pixels.

After controlling the conversion gains of the first and second pixels, the reset signal RG may be inactivated. At this time, a reset potential of the charge detection nodes FD of the first and second pixels may be detected to output a reference signal.

After outputting the reference signal, the charge transfer signal TG may be activated to transfer the photocharges integrated or accumulated in the photoelectric conversion element PD into the charge detection node FD. Potentials of the charge detection nodes FD may be detected after the charge transfer signal TG is inactivated, and thus the first and second pixel signals may be output from the first and second pixels, respectively. In other words, the high-illumination and low-illumination pixel signals in each of the rows may be output at the same time. As a result, a dynamic range of an image in which the low-illumination region and the high-illumination region are mixed with each other may be enlarged or increased in real time.

Figure 7A:
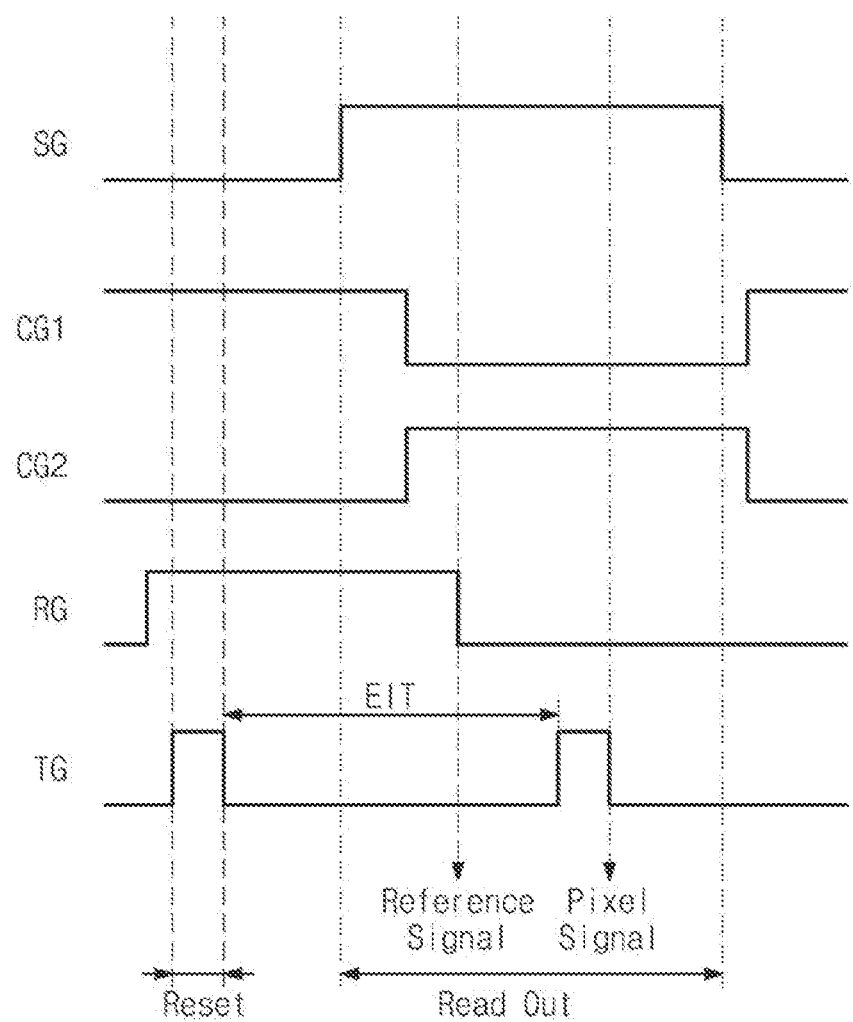
Figure 7B:
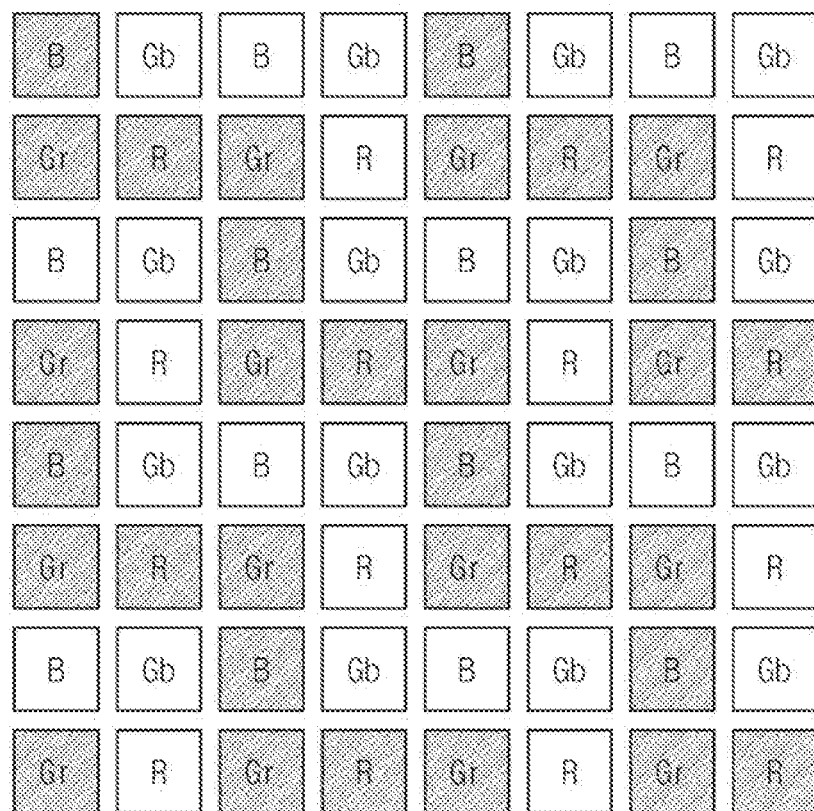

According to the example embodiment illustrated in FIGS. 7A and 7B, the first and second conversion gain control signals CG1 and CG2 may be input to the unit pixels of each of the rows opposite to that of the example embodiment of FIG. 6A. In this case, the first pixels may have the second conversion gain (e.g., the high conversion gain), and the second pixels may have the first conversion gain (e.g., the low conversion gain).

Thus, as illustrated in FIG. 7B, the high-illumination pixels LCG and the low-illumination pixels HCG may be arranged opposite to the arrangement of FIG. 6B, and the first and second pixel signals may be output opposite to that of the example embodiment of FIG. 6B. As a result, the low-illumination image may be obtained from the first pixels, and the high-illumination image may be obtained from the second pixels.

Figure 8A:
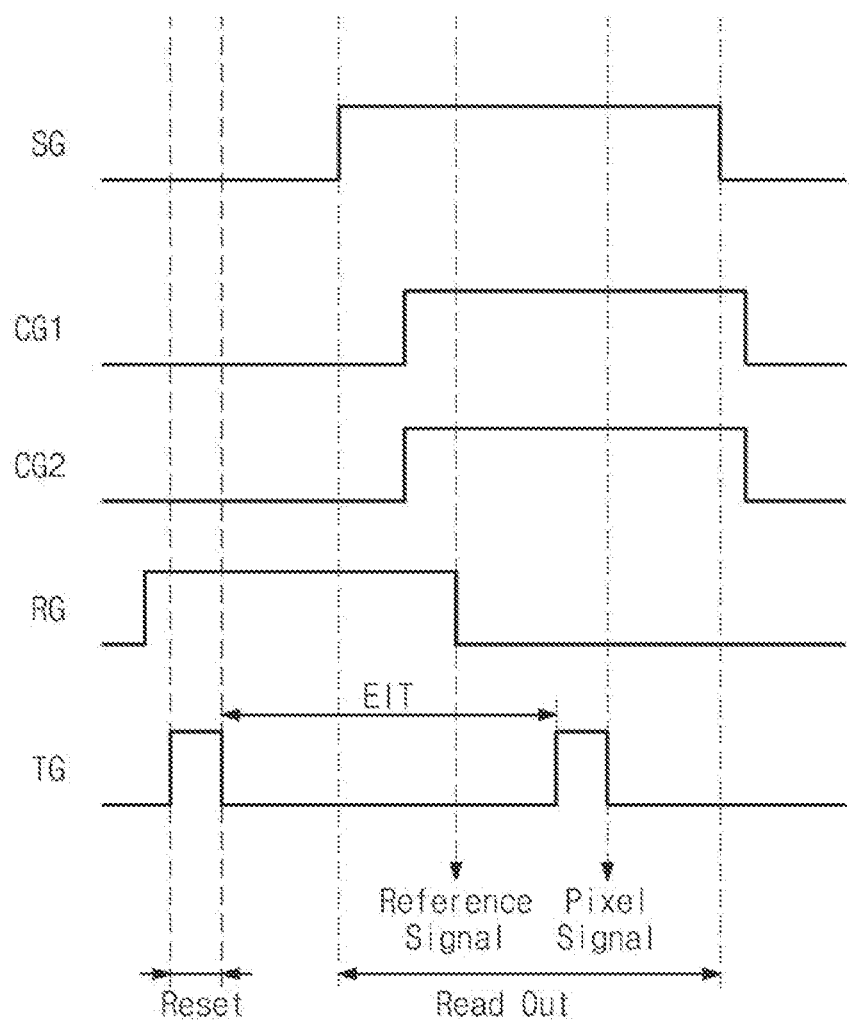
Figure 8B:
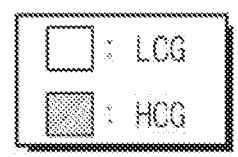

According to the example embodiment illustrated in FIGS. 8A and 8B, all of the first and second conversion gain control signals CG1 and CG2 may be activated to be input to the pixel array 10. In this case, since the capacitances of the charge detection nodes FD of the first and second pixels are increased, the first and second pixels may have the first conversion gain (e.g., the low conversion gain). Thus, as illustrated in FIG. 8B, all of the first and second pixels may be the high-illumination pixels LCG which can obtain the high-illumination image of which noise is reduced.

Figure 9A:
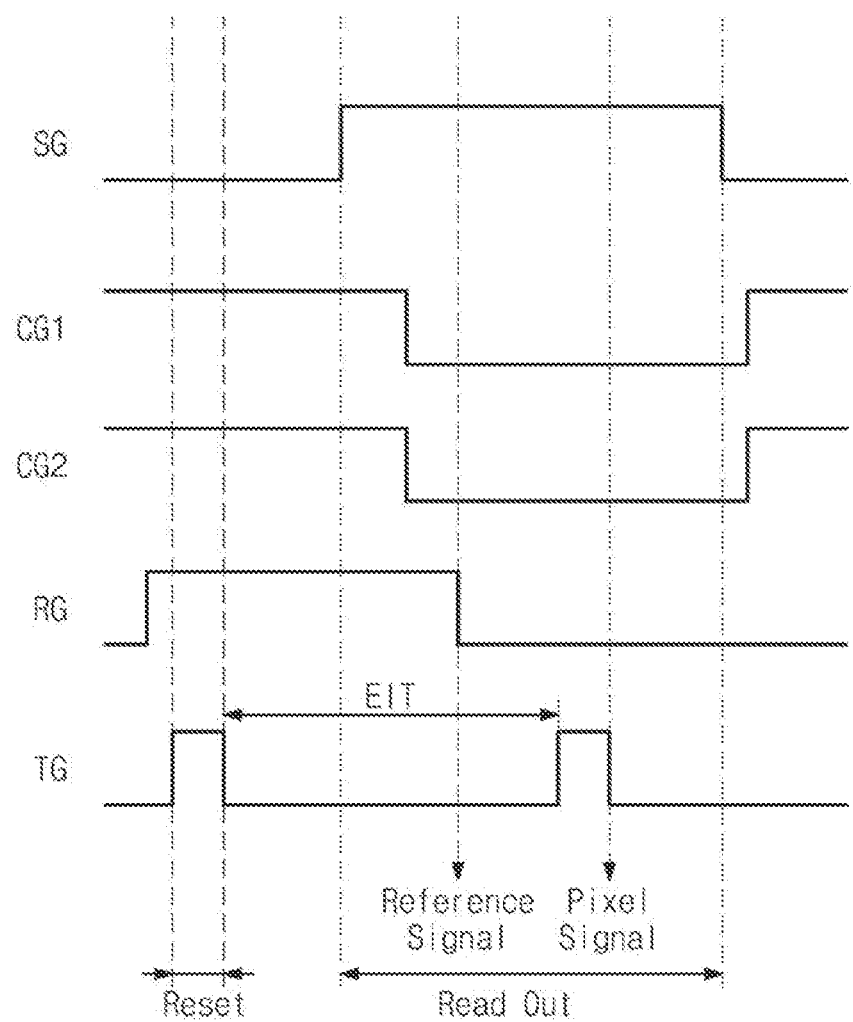
Figure 9B:
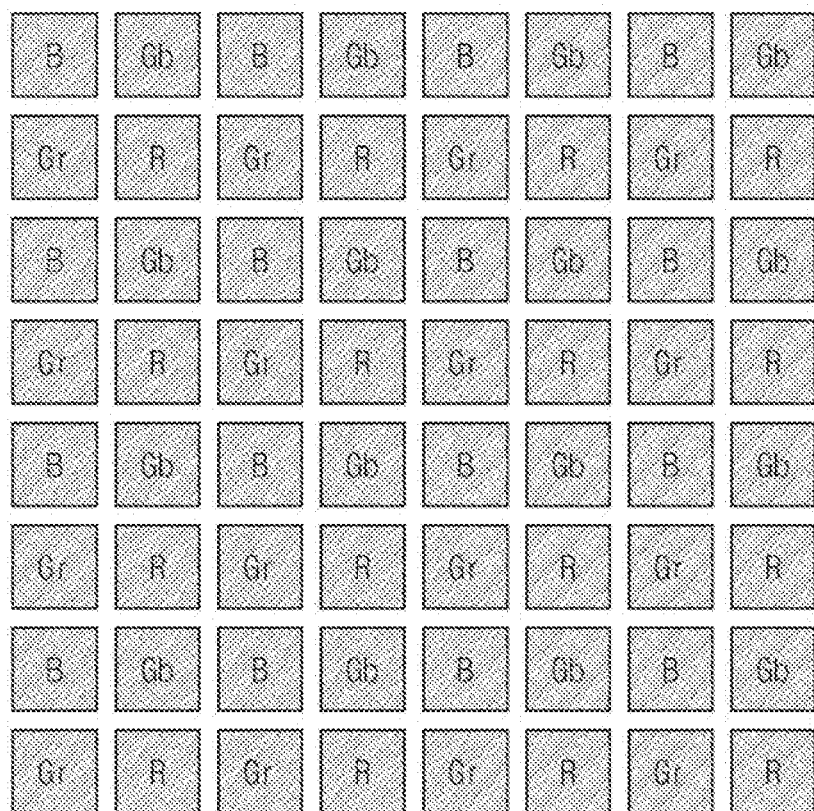

According to the example embodiment illustrated in FIGS. 9A and 9B, all of the first and second conversion gain control signals CG1 and CG2 may be inactivated to be input to the pixel array 10. In this case, since the capacitances of the charge detection nodes FD of the first and second pixels are not varied, the first and second pixels may have the second conversion gain (e.g., the high conversion gain). Thus, as illustrated in FIG. 9B, all of the first and second pixels may be the low-illumination pixels HCG which can obtain the low-illumination image with improved sensitivity.

Figure 10A:
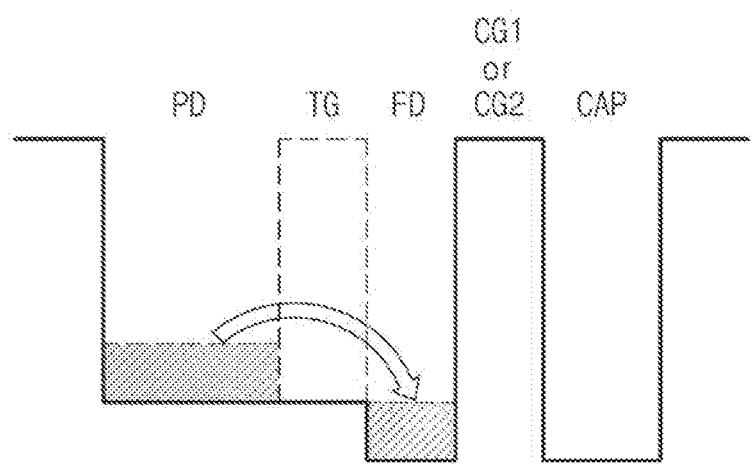
FIGS. 10A and 10B are diagrams illustrating potential levels of a unit pixel in operation of an image sensor according to example embodiments.
Figure 10B:
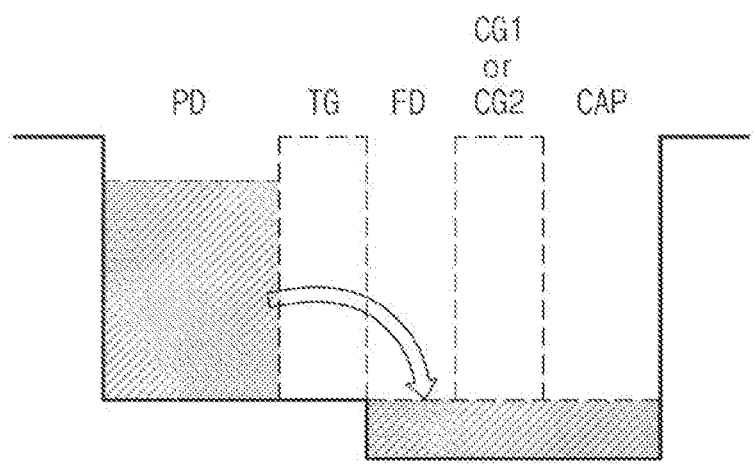

FIGS. 10A and 10B are diagrams illustrating potential levels of the unit pixels in operation of the pixel array of FIG. 5. FIG. 10A illustrates a potential level of the low-illumination pixel HCG, and FIG. 10B illustrates a potential level of the high-illumination pixel LCG.

Referring to FIGS. 5 and 10A, since a small amount of light is incident on the photoelectric conversion element PD of the low-illumination pixel, a small amount of photocharges may fill the photoelectric conversion element PD of the low-illumination pixel.

In the low-illumination pixel, the charge detection node FD may have a low capacitance since the conversion gain transistor CGX is turned off. When the transfer transistor TX is turned on, the photocharges accumulated in the photoelectric conversion element PD may be transferred into the charge detection node FD having the low capacitance in the low-illumination pixel.

Referring to FIGS. 5 and 10B, the photoelectric conversion element PD of the high-illumination pixel may be completely filled with photocharges by strong light incident on the photoelectric conversion element PD. In the high-illumination pixel, the conversion gain transistor CGX may be turned on to connect the capacitor CAP to the charge detection node FD, and thus the capacitance of the charge detection node FD may be increased. At this time, the capacitance of the charge detection node FD may be greater than a full well capacity of the photoelectric conversion element PD. Thus, when the transfer transistor TX is turned on, the photocharges accumulated in the photoelectric conversion element PD may be transferred to the charge detection node FD having the increased capacitance.

Figure 11A:
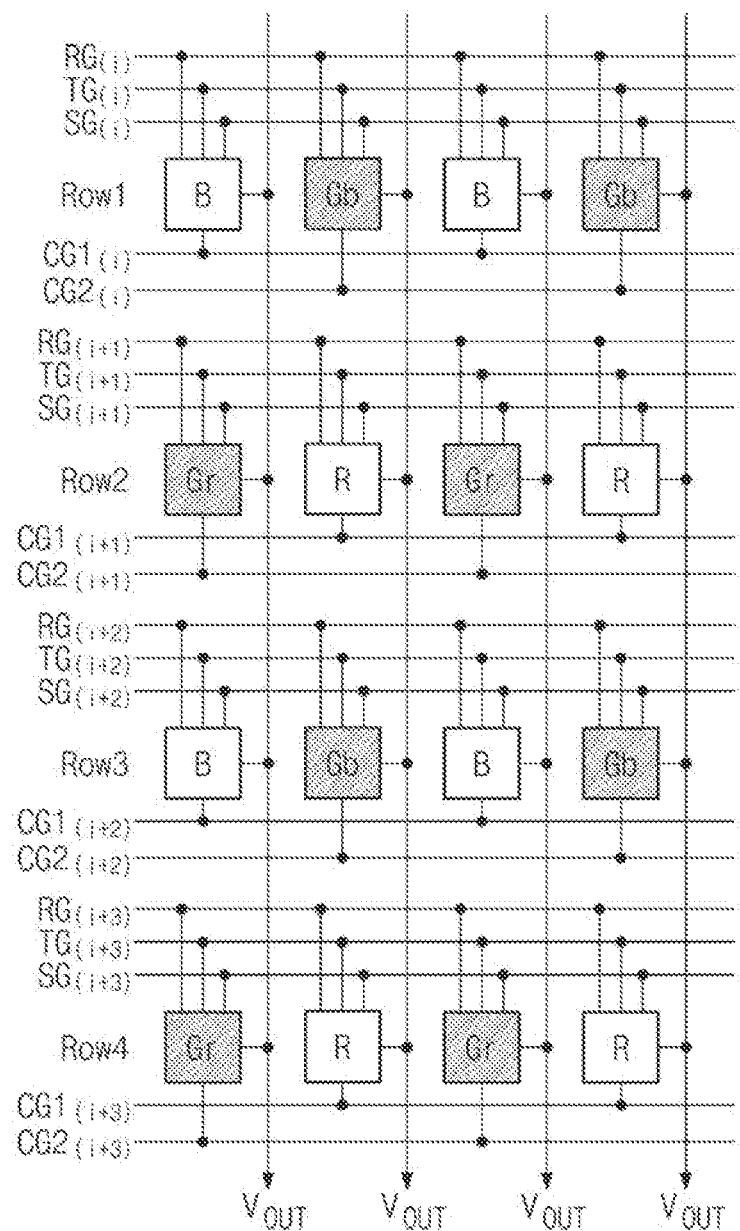
FIGS. 11A and 12A are schematic diagrams illustrating pixel arrays of image sensors according to example embodiments.
Figure 11B:
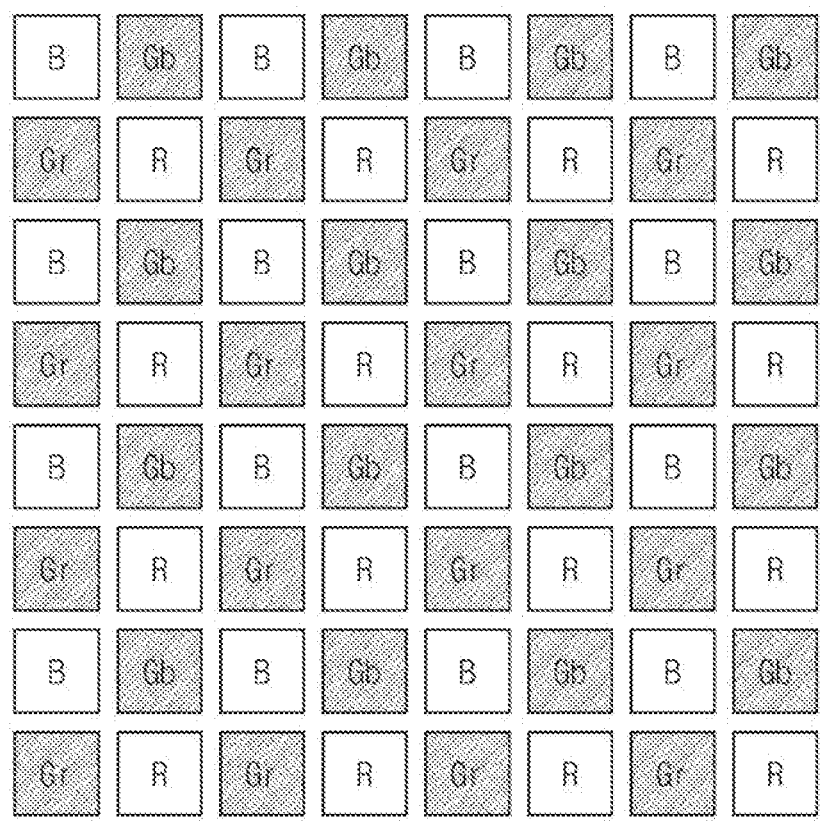
FIGS. 11B and 12B are views illustrating characteristic changes of the pixel arrays in operation of the image sensors of FIGS. 11A and 12A, respectively.
Figure 12A:
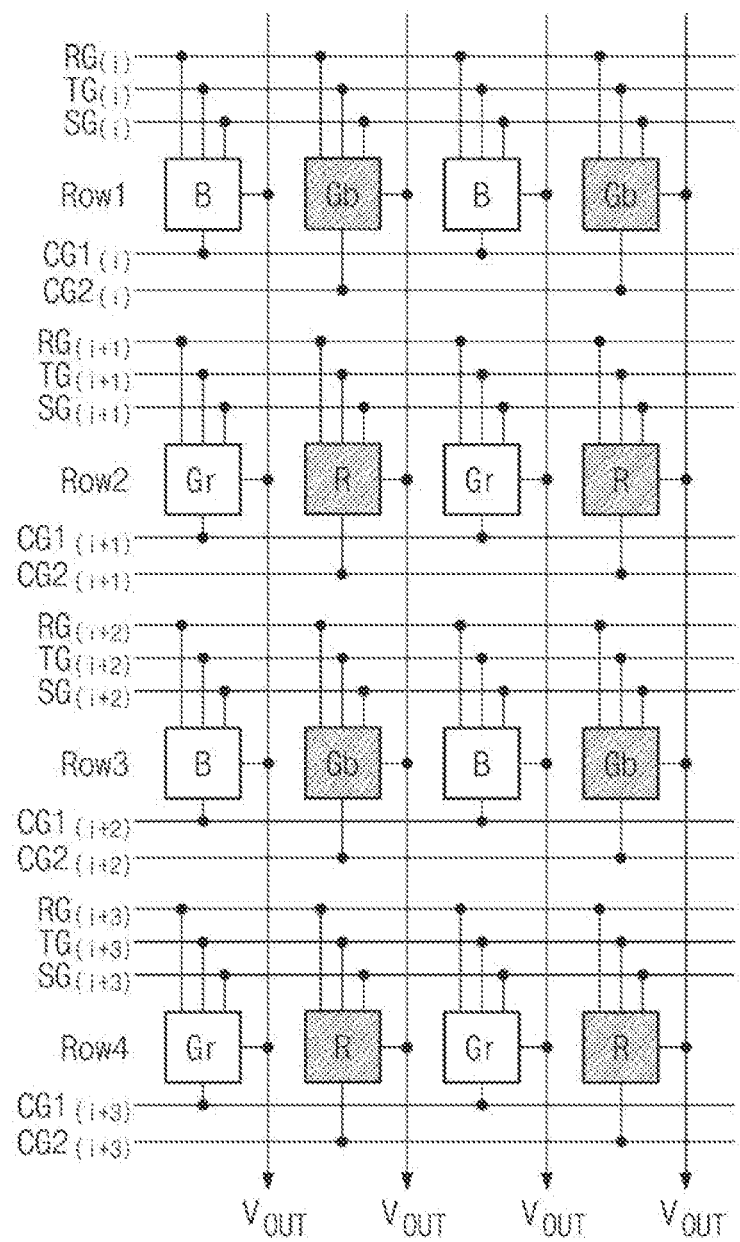
Figure 12B:
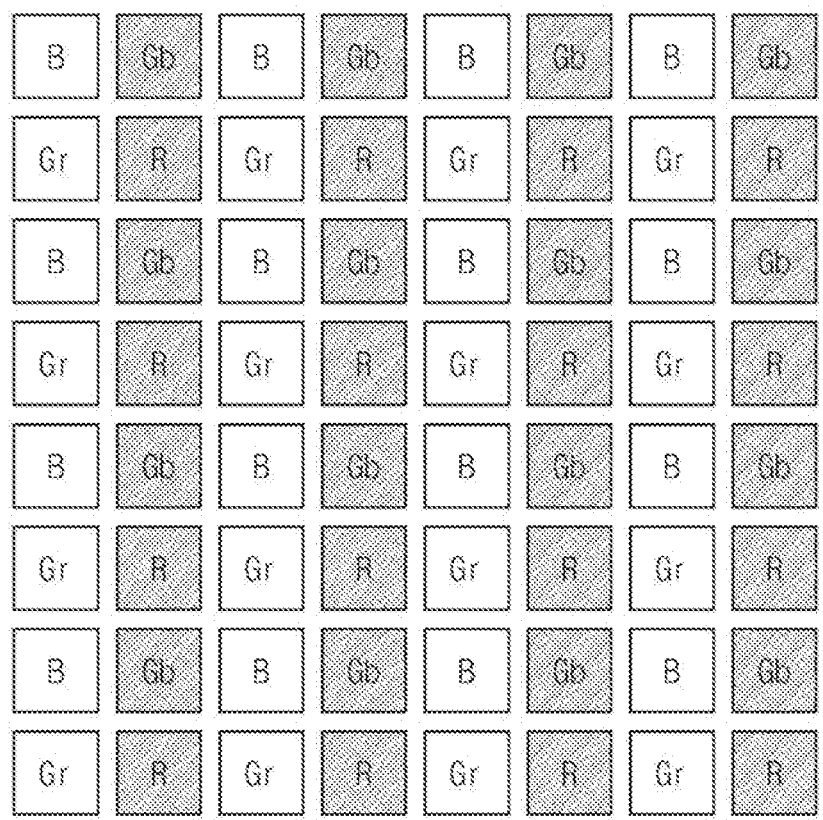

FIGS. 11A and 12A are schematic diagrams illustrating pixel arrays of image sensors according to example embodiments. FIGS. 11B and 12B are views illustrating characteristic changes of the pixel arrays in operation of the image sensors of FIGS. 11A and 12A, respectively. Hereinafter, the same elements as described in the above example embodiments will be indicated by the same reference numerals or the same reference designators, and the descriptions thereto will be omitted or mentioned briefly for the purpose of ease and convenience in explanation.

Referring to FIG. 11A, each of rows Row1, Row2, Row3, and Row4 of a pixel array 10 may include both first and second pixels, and the first pixels and the second pixels may be alternately arranged in a row direction and a column direction. In other words, the first pixels in two adjacent rows may be arranged in a zigzag form in the row direction, and the second pixels in the two adjacent rows may also be arranged in a zigzag form in the row direction. Likewise, the first pixels in two adjacent columns may be arranged in a zigzag form in the column direction, and the second pixels in the two adjacent columns may also be arranged in a zigzag form in the column direction. Each of the first and second pixels may have the circuit elements of FIG. 4A, 4B, 4C, or 4D.

As described above, in each of the rows Row1, Row2, Row3, and Row4, the first pixels may be connected to the first conversion gain control line $CG1_{(i)}$, $CG1_{(i+1)}$, $CG1_{(i+2)}$, or $CG1_{(i+3)}$ and the second pixels may be connected to the second conversion gain control line $CG2_{(i)}$, $CG2_{(i+1)}$, $CG2_{(i+2)}$, or $CG2_{(i+3)}$. The first and second pixels may be controlled by the first and second conversion gain control signals, respectively, based on an image environment.

In the example embodiment illustrated in FIG. 11A, when the first conversion gain control signal is activated and the second conversion gain control signal is inactivated, the first pixels may be the high-illumination pixels LCG having the low conversion gain and the second pixels may be the low-illumination pixels HCG having the high conversion gain, as illustrated in FIG. 11B. In the example embodiment illustrated in FIG. 11A, when the first and second conversion gain control signals are controlled differently, the low-illumination pixels HCG and the high-illumination pixels LCG may be arranged opposite to the arrangement illustrated in FIG. 11B or all of the unit pixels may be the high-illumination pixels LCG or the low-illumination pixels HCG.

Referring to FIG. 12A, each of rows Row1, Row2, Row3, and Row4 of a pixel array 10 may both include first and second pixels, and the first pixels and the second pixels may be alternately arranged in a row direction. In addition, all of unit pixels in each of columns may be the first pixels or the second pixels.

In the example embodiment illustrated in FIG. 12A, when the first conversion gain control signal is activated and the second conversion gain control signal is inactivated, the high-illumination pixels LCG and the low-illumination pixels HCG may be alternately arranged as illustrated in FIG. 12B. Alternatively, when the first and second conversion gain control signals are controlled differently, the low-illumination pixels HCG and the high-illumination pixels LCG may be arranged opposite to the arrangement illustrated in FIG. 12B or all of the unit pixels may be the high-illumination pixels LCG or the low-illumination pixels HCG.

Figure 13A:
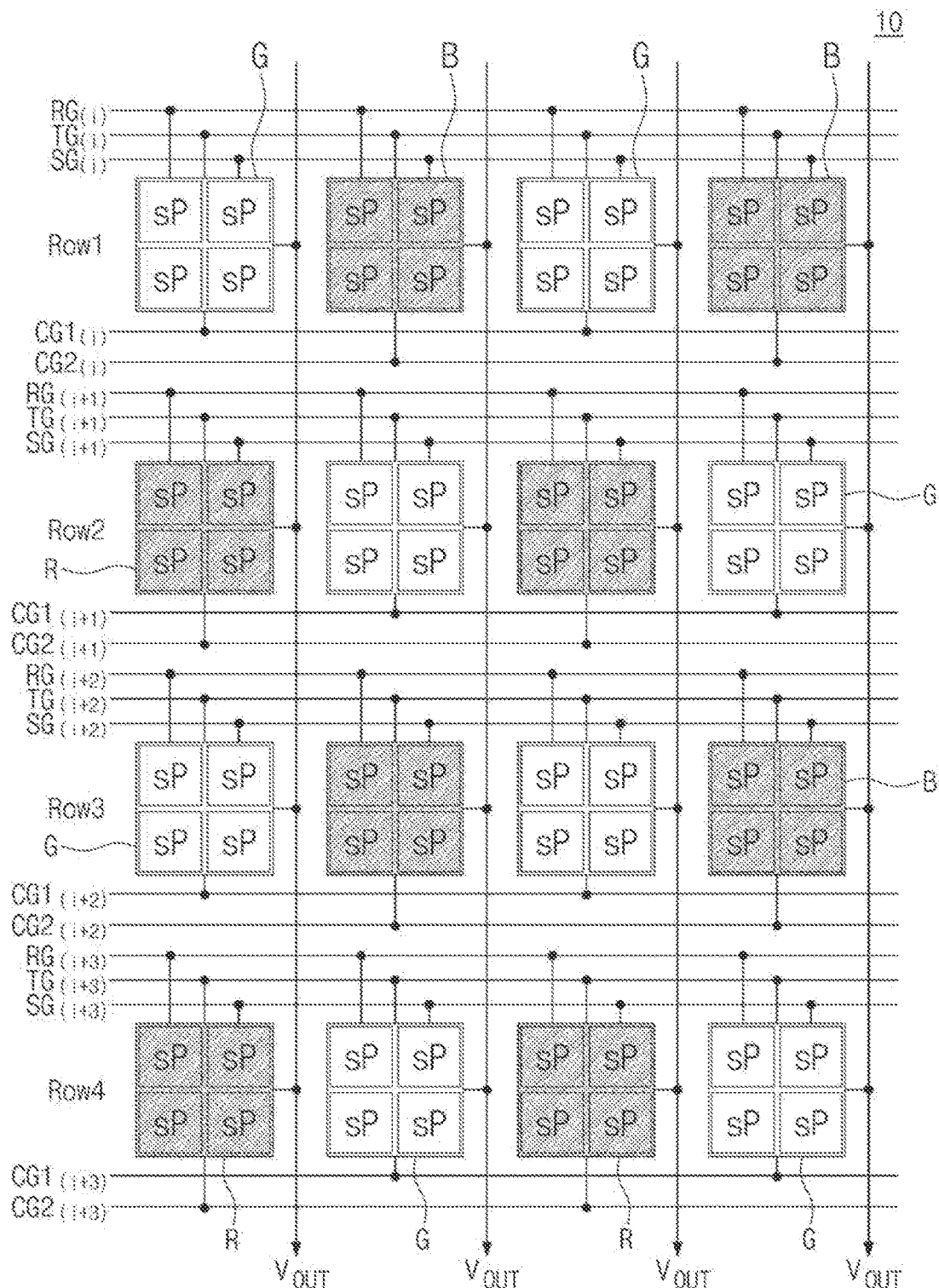
FIG. 13A is a schematic diagram illustrating a pixel array of an image sensor according to an example embodiment.
Figure 13B:
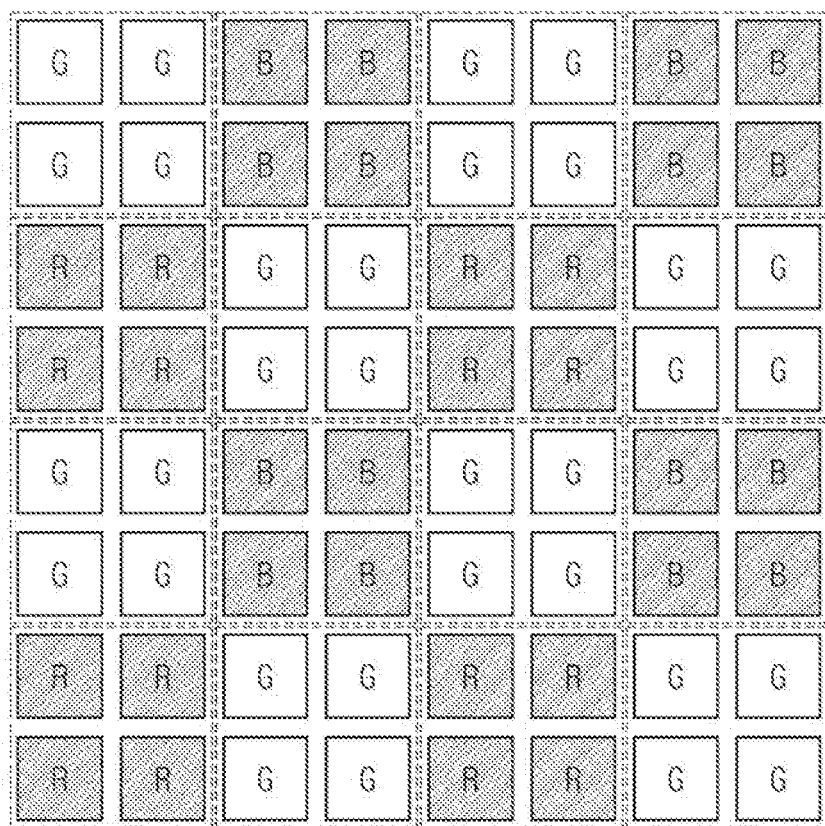
FIG. 13B is a view illustrating a characteristic change of the pixel array in operation of the image sensor of FIG. 13A.
Figure 13B:
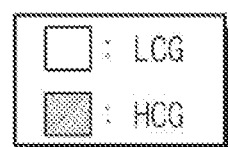

FIG. 13A is a schematic diagram illustrating a pixel array of an image sensor according to an example embodiment. FIG. 13B is a view illustrating a characteristic change of the pixel array in operation of the image sensor of FIG. 13A. Hereinafter, the same elements as described in the above example embodiments will be indicated by the same reference numerals or the same reference designators, and the descriptions thereto will be omitted or mentioned briefly for the purpose of ease and convenience in explanation.

Referring to FIGS. 13A and 13B, each of unit pixels B, R, and G may include 2×2 sub-pixels sP and may have one color filter. In other words, the sub-pixels sP of each of the unit pixels B, R, and G may share the color filter having one color. For example, each of the unit pixels B, R, and G may include four photoelectric conversion elements PD and four transfer transistors which share one charge detection node FD, as illustrated in FIG. 4D. Each of the unit pixels B, R, and G includes four sub-pixels sP in FIGS. 13A and 13B. However, example embodiments are not limited thereto. In other example embodiments, each of the unit pixels B, R, and G may include two sub-pixels sP.

In some example embodiments, each of rows Row1, Row2, Row3, and Row4 of a pixel array 10 may include first pixels connected to a first conversion gain control line $CG1_{(i)}$, $CG1_{(i+1)}$, $CG1_{(i+2)}$, or $CG1_{(i+3)}$ and second pixels connected to a second conversion gain control line $CG2_{(i)}$, $CG2_{(i+1)}$, $CG2_{(i+2)}$, or $CG2_{(i+3)}$. Conversion gains of the first pixels and the second pixels may be varied according to first conversion gain control signal and second conversion gain control signals, respectively. In each of the first pixels, the sub-pixels sP may be low-illumination pixels HCG or high-illumination pixels LCG. Likewise, in each of the second pixels, the sub-pixels sP may be low-illumination pixels HCG or high-illumination pixels LCG.

Figure 14A:
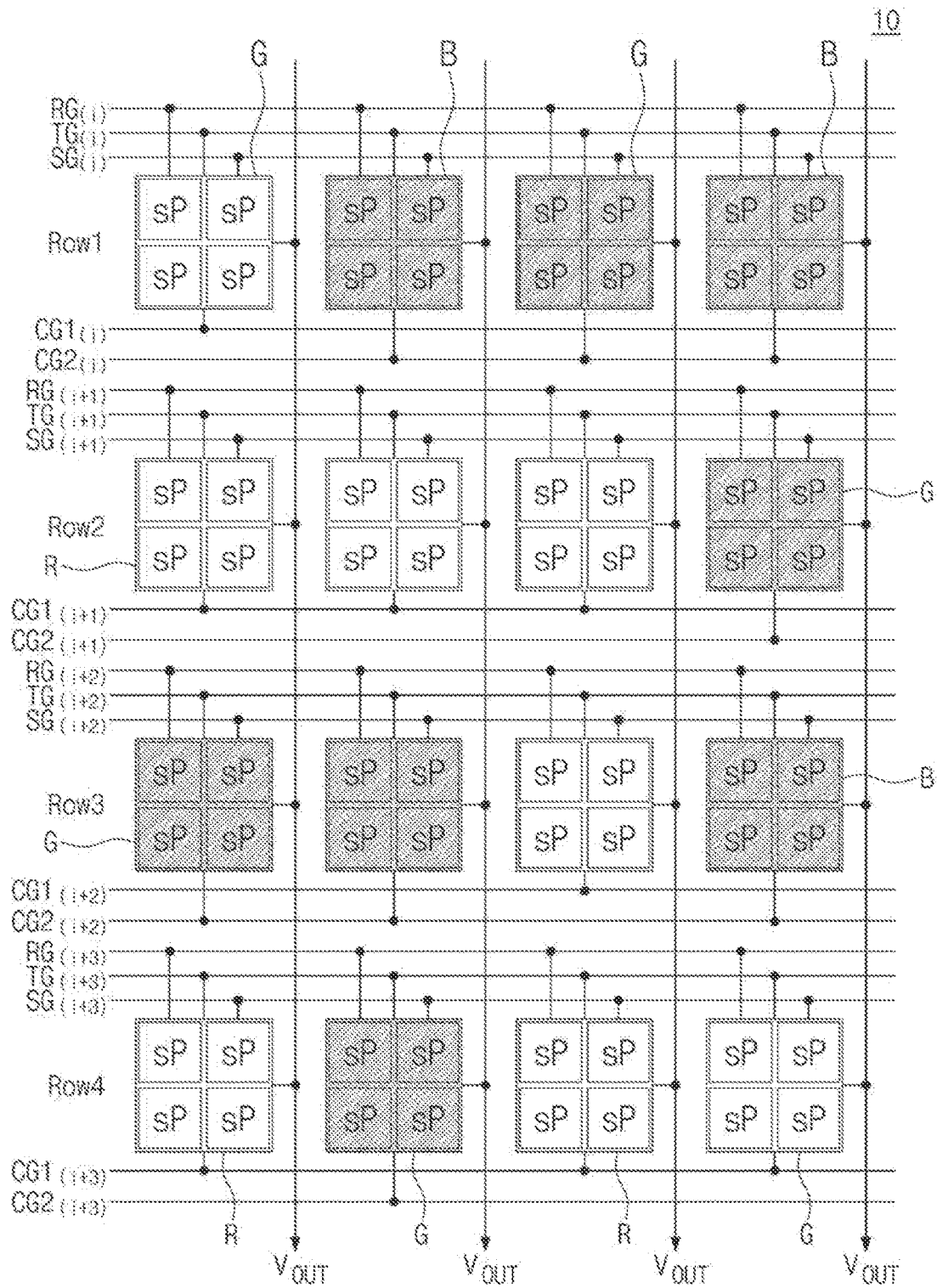
FIG. 14A is a schematic diagram illustrating a pixel array of an image sensor according to an example embodiment.
Figure 14B:
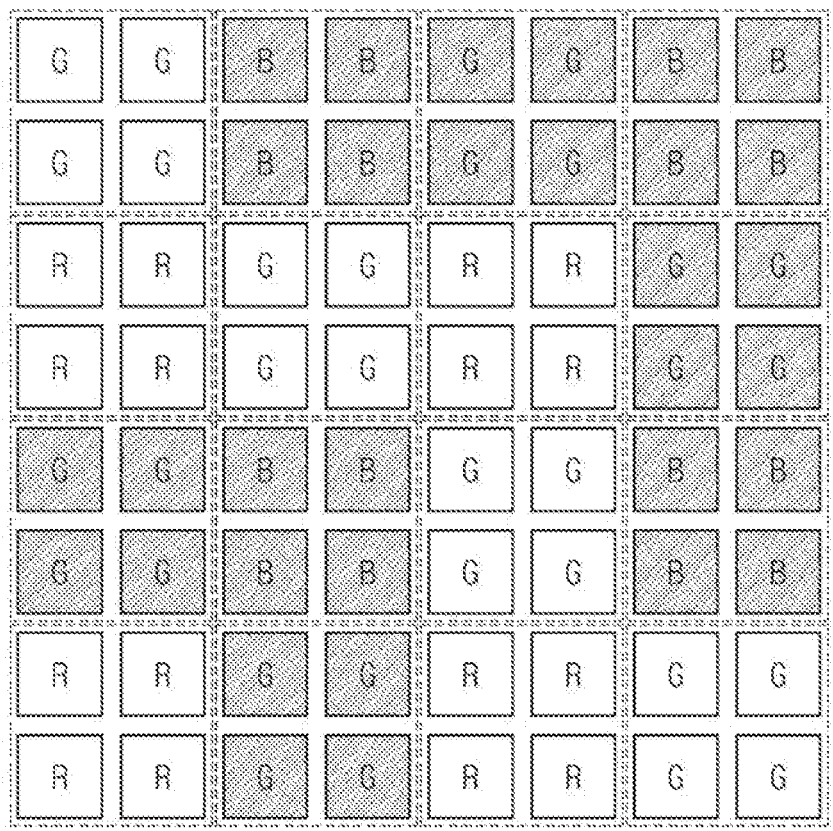
FIG. 14B is a view illustrating a characteristic change of the pixel array in operation of the image sensor of FIG. 14A.
Figure 14B:
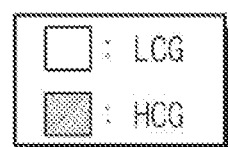

FIG. 14A is a schematic diagram illustrating a pixel array of an image sensor according to an example embodiment. FIG. 14B is a view illustrating a characteristic change of the pixel array in operation of the image sensor of FIG. 14A. Hereinafter, the same elements as described in the above example embodiments will be indicated by the same reference numerals or the same reference designators, and the descriptions thereto will be omitted or mentioned briefly for the purpose of ease and convenience in explanation.

FIGS. 14A and 14B illustrate a 4×4 pixel array 10 as an example. In addition, FIGS. 14A and 14B illustrate arrangement of high-illumination pixels LCG having a first conversion gain and low-illumination pixels HCG having a second conversion gain and arrangement of color filters R, G, and B.

In some example embodiments, each of rows Row1, Row2, Row3, and Row4 of a pixel array 10 may include first pixels connected to a first conversion gain control line $CG1_{(i)}$, $CG1_{(i+1)}$, $CG1_{(i+2)}$, or $CG1_{(i+3)}$ and second pixels connected to a second conversion gain control line $CG2_{(i)}$, $CG2_{(i+1)}$, $CG2_{(i+2)}$, or $CG2_{(i+3)}$.

Referring to FIGS. 14A and 14B, each of the first and second pixels may include four sub-pixels sP sharing a color filter having the same color. The first pixels may be arranged in a stepped shape in a diagonal direction, and the second pixels may be arranged in a stepped shape in the diagonal direction. In more detail, as described with reference to FIG. 3, the number of the first pixels may be different from the number of the second pixels in each of the rows Row1, Row2, Row3, and Row4. In addition, the number of the first pixels disposed in odd-numbered rows Row1 and Row3 may be different from the number of the first pixels disposed in even-numbered rows Row2 and Row4. Likewise, the number of the first pixels may be different from the number of the second pixels in each of the columns. In addition, the number of the first pixels disposed in an odd-numbered column may be different from the number of the first pixels disposed in an even-numbered column.

Figure 15:
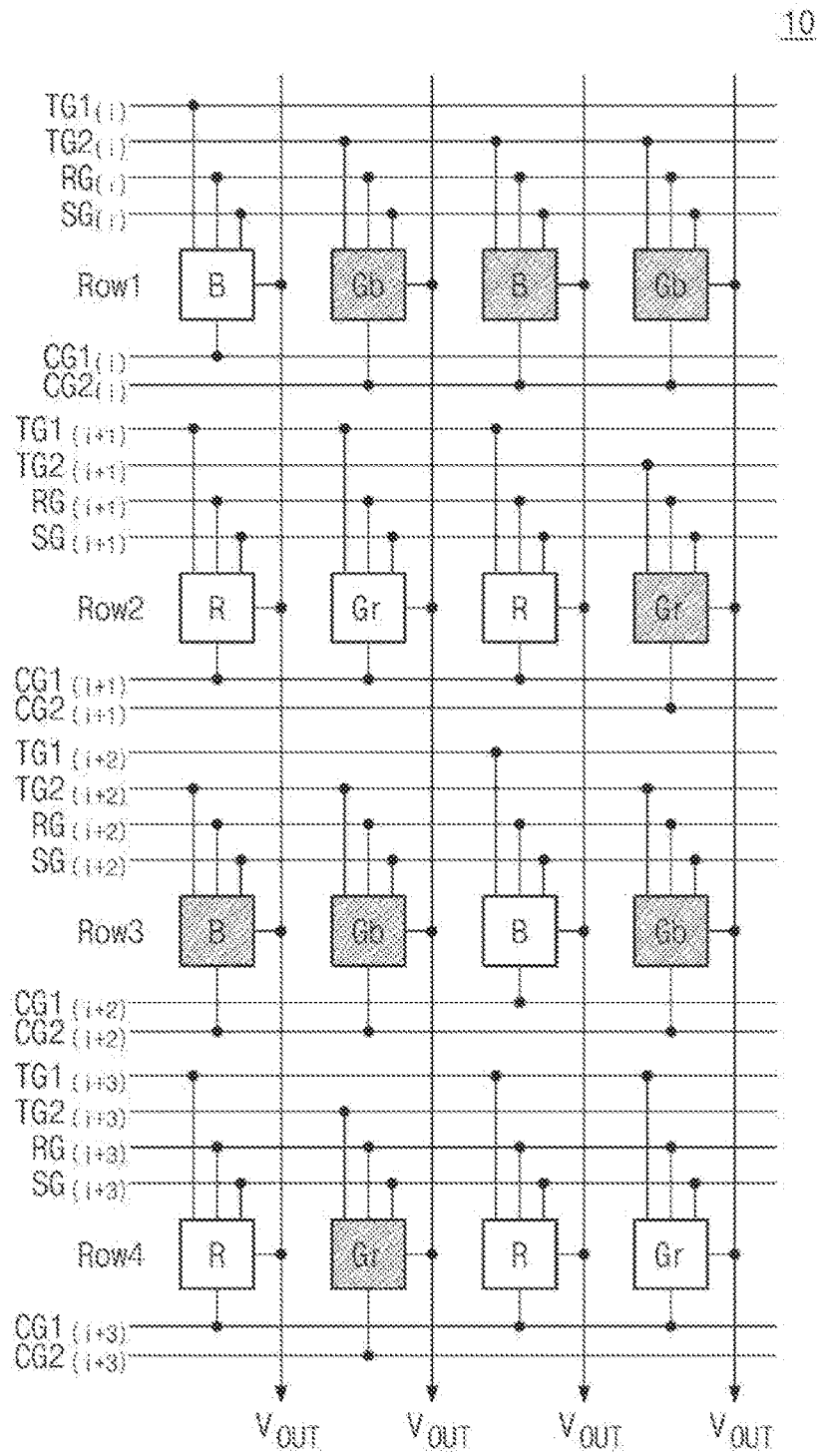
FIG. 15 is a schematic diagram illustrating a pixel array of an image sensor according to an example embodiment.
Figure 16:
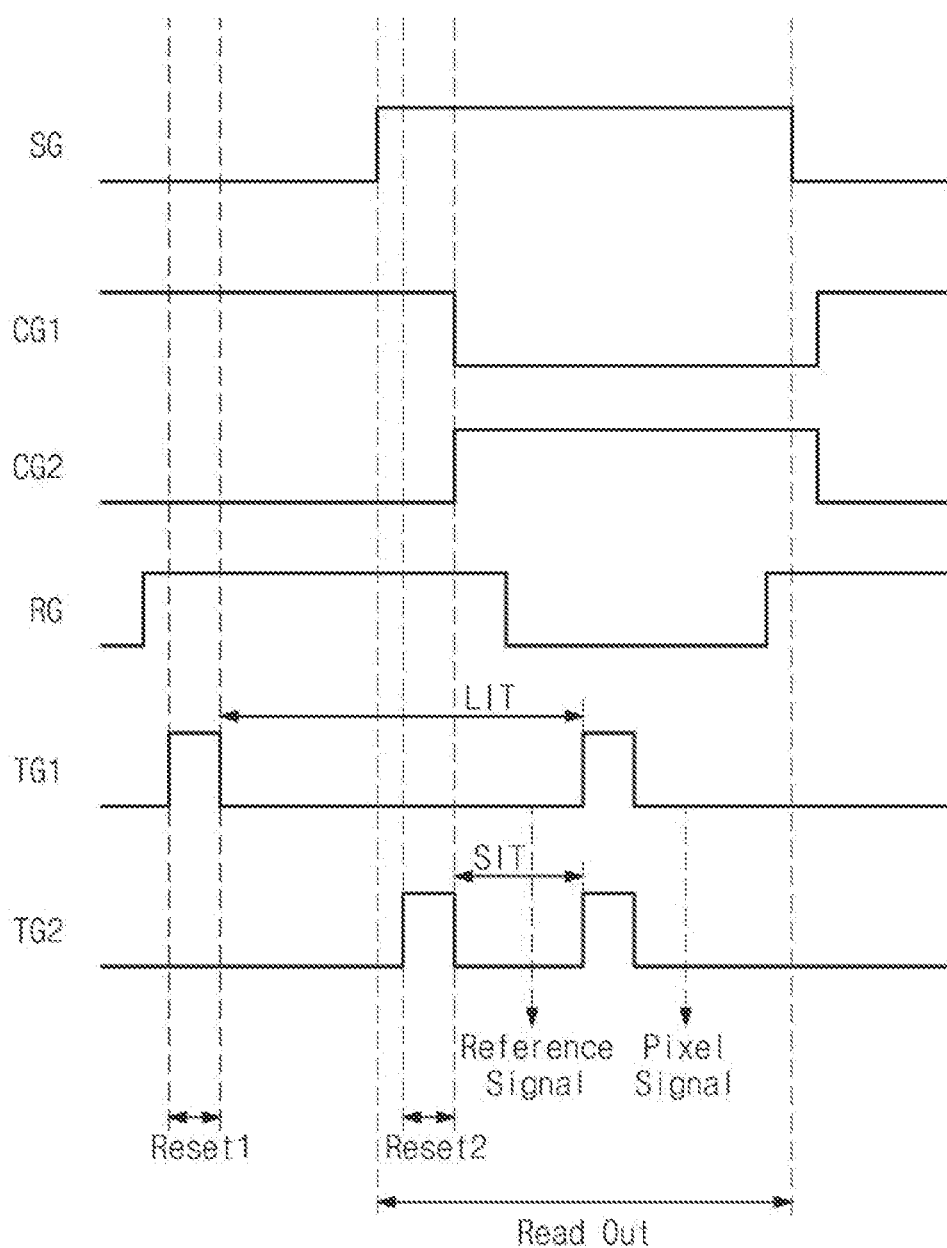
FIG. 16 is a timing diagram illustrating operation of the image sensor of FIG. 15.

FIG. 15 is a schematic diagram illustrating a pixel array of an image sensor according to an example embodiment. FIG. 16 is a timing diagram illustrating operation of the image sensor of FIG. 15. Hereinafter, the same elements as described in the above example embodiments will be indicated by the same reference numerals or the same reference designators, and the descriptions thereto will be omitted or mentioned briefly for the purpose of ease and convenience in explanation.

Referring to FIG. 15, each of unit pixels R, B, Gb, and Gr may be connected to a first or second conversion gain control line $CG1_{(i)}$, $CG1_{(i+1)}$, $CG1_{(i+2)}$, or $CG1_{(i+3)}$, $CG2_{(i)}$, $CG2_{(i+1)}$, $CG2_{(i+2)}$, or $CG2_{(i+3)}$ in each of rows Row1, Row2, Row3, and Row4 of a pixel array 10. In addition, according to this example embodiment, each of unit pixels R, B, Gb, and Gr may be connected to a first or second charge transfer line $TG1_{(i)}$, $TG1_{(i+1)}$, $TG1_{(i+2)}$, or $TG1_{(i+3)}$, $TG2_{(i)}$, $TG2_{(i+1)}$, $TG2_{(i+2)}$, or $TG2_{(i+3)}$ in each of the rows Row1, Row2, Row3, and Row4 of a pixel array 10.

Each of the unit pixels R, B, Gb, and Gr may include at least one photoelectric conversion element PD, a readout circuit, and a conversion gain variable circuit. For example, each of the unit pixels R, B, Gb, and Gr may have the circuit elements of FIG. 4A, 4B, 4C, or 4D, as described above.

According to this example embodiment, a conversion gain of each of the unit pixels R, B, Gb, and Gr may be varied by the first or second conversion gain control signal, and a light integration time (i.e., a light exposure time) of each of the unit pixels R, B, Gb, and Gr may be varied by a first or second charge transfer signal. For example, the conversion gain and the light integration time (i.e., first light exposure time) of first pixels may be controlled independently of the conversion gain and the light integration time (i.e., second light exposure time) of second pixels.

In some example embodiments, each of the rows Row1, Row2, Row3, and Row4 may include the first pixels connected to the first conversion gain control line $CG1_{(i)}$, $CG1_{(i+1)}$, $CG1_{(i+2)}$, or $CG1_{(i+3)}$ and the second pixels connected to the second conversion gain control line $CG2_{(i)}$, $CG2_{(i+1)}$, $CG2_{(i+2)}$, or $CG2_{(i+3)}$. In addition, the first pixels may be connected to the first charge transfer lines $TG1_{(i)}$ to $TG1_{(i+3)}$, and the second pixels may be connected to the second charge transfer lines $TG2_{(i)}$ to $TG2_{(i+3)}$.

In some example embodiments, the first pixels may be controlled to have a first conversion gain and a first light integration time, and the second pixels may be controlled to have a second conversion gain and a second light integration time.

For example, as illustrated in FIG. 16, a first charge transfer signal TG1 may be provided to the first pixel. The first charge transfer signal may be turned on again after a long time LIT after the photoelectric conversion element PD is reset. In addition, since the first conversion gain control signal CG1 which is inactivated is applied to the first pixel, the conversion gain transistor CGX of the first pixel may be turned off. Thus, the first pixel may have a high conversion gain to output a pixel signal with improved sensitivity.

When high-illumination light is incident on the second pixel, a second charge transfer signal TG2 may be provided to the second pixel. The second charge transfer signal TG2 may be turned on again after a short time SIT after the photoelectric conversion element PD is reset. In addition, since the second conversion gain control signal CG2 which is activated is applied to the second pixel, the conversion gain transistor CGX of the second pixel may be turned on. Thus, the second pixel may have a low conversion gain to reduce noise of a pixel signal output from the second pixel.

In other words, when low-illumination light is incident on the first pixels, the first pixels may have the high conversion gain and may be exposed to light for a long time. In addition, when high-illumination light is incident on the second pixels, the second pixels may have the low conversion gain and may be exposed to light for a short time.

According to this example embodiment, the first and second pixels may have the conversion gains different from each other and exposure times different from each other, and thus a dynamic range of the image sensor may be enlarged or increased.

According to some example embodiments, the first pixels and the second pixels may be disposed in each of the rows of the pixel array, and the conversion gain of the first pixels may be different from the conversion gain of the second pixels. Thus, the image sensor may detect the low-illumination image and the high-illumination image at the same time. The conversion gain may be reduced in the pixels converting light provided from the high-illumination region, thereby reducing a signal-to-noise ratio. In addition, the conversion gain may be increased in the pixels converting light provided from the low-illumination region, thereby improving the sensitivity. In other words, the dynamic range may be enlarged or increased in the image in which the low-illumination region and the high-illumination region are mixed with each other. As a result, a clear image may be realized.

While example embodiments have been described, it will be apparent to those skilled in the art that various changes and modifications may be made without departing from the spirit and scope of the inventive concept. Therefore, it should be understood that the above example embodiments are not limiting, but illustrative. Thus, the scope of the inventive concept is to be determined by the broadest permissible interpretation of the following claims and their equivalents, and shall not be restricted or limited by the foregoing description.

What is claimed is:

1. An image sensor comprising:
   a first pixel group sharing a first color filter, the first pixel group being configured to share a first conversion gain transistor, a first reset transistor, a first floating diffusion region, a first driving transistor, and a first selection transistor; and
   a second pixel group sharing a second color filter, the second pixel group being disposed directly adjacent to the first pixel group in a first direction and is configured to share a second conversion gain transistor, a second reset transistor, a second floating diffusion region, a second driving transistor, and a second selection transistor,
   wherein the first conversion gain transistor is connected to the first floating diffusion region and is connected to the first reset transistor in series,
   wherein the second conversion gain transistor is connected to the second floating diffusion region and is connected to the second reset transistor in series, and
   wherein each of the first pixel group and the second pixel group comprises 2×2 photoelectric conversion elements.

2. The image sensor of claim 1, wherein the first color filter is a green color filter and the second color filter is a red color filter.

3. The image sensor of claim 2, further comprising:
   a third pixel group sharing a third color filter, the third pixel group being disposed directly adjacent to the first pixel group in a second direction perpendicular to the first direction; and
   a fourth pixel group sharing a fourth color filter, the fourth pixel group being disposed directly adjacent to the third pixel group in the first direction,
   wherein the first pixel group and the third pixel group are connected to a first output line,
   wherein the second pixel group and the fourth pixel group are connected to a second output line different from the first output line, wherein each of the third pixel group and the fourth pixel group comprises 2×2 photoelectric conversion elements, and wherein the first output line and the second output line extend in the second direction.

4. The image sensor of claim 1, wherein the first color filter is a blue color filter and the second color filter is a green color filter.

5. The image sensor of claim 4, wherein the first conversion gain transistor and the second conversion gain transistor are connected to a conversion gain control line.

6. The image sensor of claim 5, wherein the first floating diffusion region has a first full well capacity when the first conversion gain transistor is turned off and the first floating diffusion region has a second full well capacity greater than the first full well capacity when the first conversion gain transistor is turned on in response to a conversion gain control signal received via the conversion gain control line.

7. An image sensor comprising:
a first pixel group sharing a first color filter, the first pixel group being connected to a first transistor, a first reset transistor, a first floating diffusion region, a first driving transistor, and a first selection transistor; and
a second pixel group sharing a second color filter, the second pixel group being disposed directly adjacent to the first pixel group in a first direction and is connected to a second transistor, a second reset transistor, a second floating diffusion region, a second driving transistor, and a second selection transistor,
wherein the first transistor and the first reset transistor are connected to the first floating diffusion region and a pixel power voltage node,
wherein the second transistor and the second reset transistor are connected to the second floating diffusion region and the pixel power voltage node,
wherein the first color filter is different from the second color filter, and
wherein each of the first pixel group and the second pixel group comprises 2×2 photoelectric conversion elements.

8. The image sensor of claim 7, further comprising:
a third pixel group sharing a third color filter disposed directly adjacent to the first pixel group in a second direction perpendicular to the first direction; and
a fourth pixel group sharing a fourth color filter disposed directly adjacent to the second pixel group in the second direction,
wherein the first pixel group and the third pixel group are connected to a first output line,
wherein the second pixel group and the fourth pixel group are connected to a second output line, and
wherein each of the third pixel group and the fourth pixel group comprises 2×2 photoelectric conversion elements.

9. The image sensor of claim 8, wherein the first color filter is a red color filter and the second color filter is a green color filter.

10. The image sensor of claim 9, wherein the third color filter is a green color filter and the fourth color filter is a blue color filter.

11. The image sensor of claim 10, further comprising:
a third floating diffusion region connected to the third pixel group; and
a fourth floating diffusion region connected to the fourth pixel group.

12. An image sensor comprising:
a first pixel group sharing a first color filter, the first pixel group being connected to a first transistor, a first reset transistor, a first floating diffusion region, a first driving transistor, and a first selection transistor; and
a second pixel group sharing a second color filter, the second pixel group being disposed directly adjacent to the first pixel group in a first direction and is connected to a second transistor, a second reset transistor, a second floating diffusion region, a second driving transistor, and a second selection transistor,
wherein the first transistor and the first reset transistor are connected to the first floating diffusion region and a pixel power voltage node,
wherein the second transistor and the second reset transistor are connected to the second floating diffusion region and the pixel power voltage node,
wherein the first color filter is different from the second color filter,
wherein each of the first pixel group and the second pixel group comprises 2×2 photoelectric conversion elements, and
wherein the first pixel group and the second pixel group are connected to a first output line extending in the first direction.

13. The image sensor of claim 12, wherein the first color filter is a red color filter and the second color filter is a green color filter.

14. The image sensor of claim 12, further comprising:
a third pixel group sharing a third color filter disposed directly adjacent to the first pixel group in a second direction perpendicular to the first direction; and
a fourth pixel group sharing a fourth color filter disposed directly adjacent to the second pixel group in the first direction,
wherein the third pixel group and the fourth pixel group are connected to a second output line, and
wherein each of the third pixel group and the fourth pixel group comprises 2×2 photoelectric conversion elements.

15. The image sensor of claim 14, wherein the third color filter is a green color filter and the fourth color filter is a blue color filter.

16. The image sensor of claim 15, further comprising:
a third floating diffusion region connected to the third pixel group; and
a fourth floating diffusion region connected to the fourth pixel group.

* * * * *